United States Patent
Mukaida et al.

(10) Patent No.: US 8,239,612 B2
(45) Date of Patent: Aug. 7, 2012

(54) MEMORY CONTROLLER, FLASH MEMORY SYSTEM WITH MEMORY CONTROLLER, AND CONTROL METHOD OF FLASH MEMORY

(75) Inventors: Naoki Mukaida, Tokyo (JP); Takashi Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 911 days.

(21) Appl. No.: 12/239,127

(22) Filed: Sep. 26, 2008

(65) Prior Publication Data

US 2009/0089489 A1 Apr. 2, 2009

(30) Foreign Application Priority Data

Sep. 27, 2007 (JP) ................................. 2007-252134
Oct. 30, 2007 (JP) ................................. 2007-282480

(51) Int. Cl.
*G06F 12/00* (2006.01)
*G06F 13/00* (2006.01)
*G06F 13/28* (2006.01)
(52) U.S. Cl. ...................................................... 711/103
(58) Field of Classification Search .................. None
See application file for complete search history.

(56) References Cited

U.S. PATENT DOCUMENTS

| 6,081,447 A | 6/2000 | Lofgren et al. |
| 6,230,233 B1 * | 5/2001 | Lofgren et al. ............... 711/103 |
| 6,594,183 B1 | 7/2003 | Lofgren et al. |
| 6,732,221 B2 | 5/2004 | Ban |
| 6,850,443 B2 | 2/2005 | Lofgren et al. |
| 6,985,992 B1 | 1/2006 | Chang et al. |
| 2005/0162930 A1 * | 7/2005 | Mukaida .................. 365/185.33 |
| 2007/0150649 A1 * | 6/2007 | Asari et al. ..................... 711/103 |
| 2008/0059693 A1 * | 3/2008 | Yang et al. ..................... 711/103 |

FOREIGN PATENT DOCUMENTS

| JP | A-06-131891 | 5/1994 |
| JP | A-2000-020252 | 1/2000 |
| JP | 2007133683 | 5/2007 |

* cited by examiner

*Primary Examiner* — Yaima Campos
*Assistant Examiner* — Daniel Tsui
(74) *Attorney, Agent, or Firm* — Posz Law Group, PLC

(57) ABSTRACT

The memory controller updates a count number based on a new assignment of a logical block to a physical block, and writes count information in the physical block to which the logical block is newly assigned. The count information is defined by the count number. The memory controller decides, based on the count number and the count information stored in each physical block, whether or not to transfer stored data in a physical block to another physical block.

24 Claims, 12 Drawing Sheets

FIG. 3

| PBA | LBN | COUNT INFO. | |
|---|---|---|---|
| #0 | #30 | 00 00 30h | |
| #1 | #21 | 00 00 3Ah | |
| #2 | #22 | 00 00 2Fh | |
| #3 | #32 | 00 00 2Ah | |
| #4 | #19 | 00 00 30h | |
| #5 | | | |
| #6 | #6 | 00 00 1Ah | |
| #7 | #40 | 00 00 3Fh | ←(3A) COUNT NUMBER PRIOR TO INCREMENT:00 00 3F FAh |
| #8 | #23 | 00 00 3Ch | COUNT NUMBER AFTER INCREMENT :00 00 3F FBh |
| #9 | #33 | 00 00 30h | |
| #10 | #24 | 00 00 33h | |
| #11 | #25 | 00 00 37h | |
| #12 | #41 | 00 00 3Fh | ←(3B) COUNT NUMBER PRIOR TO INCREMENT :00 00 3F FBh |
| #13 | | | COUNT NUMBER AFTER INCREMENT :00 00 3F FCh |
| #14 | | | |
| #15 | #15 | 00 00 10h | |
| #16 | #16 | 00 00 0Fh | |
| #17 | #34 | 00 00 34h | |
| #18 | #42 | 00 00 3Fh | ←(3C) COUNT NUMBER PRIOR TO INCREMENT :00 00 3F FCh |
| #19 | #26 | 00 00 39h | COUNT NUMBER AFTER INCREMENT :00 00 3F FDh |
| #20 | #35 | 00 00 31h | |
| #21 | | | |
| #22 | #43 | 00 00 3Fh | ←(3D) COUNT NUMBER PRIOR TO INCREMENT :00 00 3F FDh |
| #23 | #36 | 00 00 35h | COUNT NUMBER AFTER INCREMENT :00 00 3F FEh |
| #24 | #37 | 00 00 36h | |
| #25 | | | |
| #26 | #1 | 00 00 2Fh | |
| #27 | #44 | 00 00 3Fh | ←(3E) COUNT NUMBER PRIOR TO INCREMENT :00 00 3F FEh |
| #28 | #38 | 00 00 31h | COUNT NUMBER AFTER INCREMENT :00 00 3F FFh |
| #29 | #39 | 00 00 2Dh | |
| #30 | #50 | 00 00 3Eh | |
| #31 | #45 | 00 00 3Fh | ←(3F) COUNT NUMBER PRIOR TO INCREMENT :00 00 3F FFh |
| #32 | #51 | 00 00 37h | COUNT NUMBER AFTER INCREMENT :00 00 40 00h |
| #33 | #52 | 00 00 2Bh | |
| #34 | | | |

| PBA | LBN | COUNT INFO. | |
|---|---|---|---|
| #0 | #30 | 00 00 30h | |
| #1 | #21 | 00 00 3Ah | |
| #2 | #22 | 00 00 2Fh | |
| #3 | #32 | 00 00 2Ah | |
| #4 | #19 | 00 00 30h | |
| #5 | | | |
| #6 | ~~#6~~ | ~~00 00 1Ah~~ | ←(4A) ERASE STORED DATA |
| #7 | #40 | 00 00 3Fh | |
| #8 | #23 | 00 00 3Ch | |
| #9 | #33 | 00 00 30h | |
| #10 | #24 | 00 00 33h | |
| #11 | #25 | 00 00 37h | |
| #12 | #41 | 00 00 3Fh | |
| #13 | | | |
| #14 | | | |
| #15 | ~~#15~~ | ~~00 00 10h~~ | ←(4B) ERASE STORED DATA |
| #16 | ~~#16~~ | ~~00 00 0Fh~~ | ←(4C) ERASE STORED DATA |
| #17 | #34 | 00 00 34h | |
| #18 | #42 | 00 00 3Fh | |
| #19 | #26 | 00 00 39h | |
| #20 | #35 | 00 00 31h | |
| #21 | | | |
| #22 | #43 | 00 00 3Fh | |
| #23 | #36 | 00 00 35h | |
| #24 | #37 | 00 00 36h | |
| #25 | | | |
| #26 | #1 | 00 00 2Fh | |
| #27 | #44 | 00 00 3Fh | |
| #28 | #38 | 00 00 31h | |
| #29 | #39 | 00 00 2Dh | |
| #30 | #50 | 00 00 3Eh | |
| #31 | #45 | 00 00 3Fh | |
| #32 | #51 | 00 00 37h | |
| #33 | #52 | 00 00 2Bh | |
| #34 | #6 | 00 00 40h | ←(4D) COPY STORED DATA IN PHYSICAL BLOCK OF PBA#6 |
| #35 | #15 | 00 00 40h | ←(4E) COPY STORED DATA IN PHYSICAL BLOCK OF PBA#15 |
| #36 | #16 | 00 00 40h | ←(4F) COPY STORED DATA IN PHYSICAL BLOCK OF PBA#16 |

| PBA | LBN | WM |
|---|---|---|
| #0 | #30 | 55h |
| #1 | #21 | 55h |
| #2 | #22 | 55h |
| #3 | #32 | 55h |
| #4 | #19 | 55h |
| #5 | | |
| #6 | #6 | AAh |
| #7 | #40 | 55h |
| #8 | #23 | 55h |
| #9 | #33 | 55h |
| #10 | #24 | 55h |
| #11 | #25 | 55h |
| #12 | #41 | 55h |
| #13 | | |
| #14 | | |
| #15 | #15 | AAh |
| #16 | #16 | AAh |
| #17 | #34 | 55h |
| #18 | #42 | 55h |
| #19 | #26 | 55h |
| #20 | #35 | 55h |
| #21 | | |
| #22 | #43 | 55h |
| #23 | #36 | 55h |
| #24 | #37 | 55h |
| #25 | | |
| #26 | #1 | 55h |
| #27 | #44 | 55h |
| #28 | #38 | 55h |
| #29 | #39 | 55h |
| #30 | #50 | 55h |
| #31 | #45 | 5Ah |
| #32 | | |
| #33 | | |
| #34 | | |
| . | . | . |

<RULE OF RENEWING WM (WRITTE MARK)>

1st WM : 55
↓
2nd WM : 5A
↓
3rd WM : A5
↓
4th WM : AA

←(4A) ASSIGNMENT LOGICAL BLOCK OF LBA#41

←(4B) ASSIGNMENT LOGICAL BLOCK OF LBA#42

←(4C) ASSIGNMENT LOGICAL BLOCK OF LBA#43

←(4D) ASSIGNMENT LOGICAL BLOCK OF LBA#44

←(4E) ASSIGNMENT LOGICAL BLOCK OF LBA#45

FIG. 8

| PBA | LBN | WM |
|---|---|---|
| #0 | #30 | 55h |
| #1 | #21 | 55h |
| #2 | #22 | 55h |
| #3 | #32 | 55h |
| #4 | #19 | 55h |
| #5 | | |
| #6 | ~~#6~~ | ~~AAh~~ | ←(5D) ERASE STORED DATA
| #7 | #40 | 55h |
| #8 | #23 | 55h |
| #9 | #33 | 55h |
| #10 | #24 | 55h |
| #11 | #25 | 55h |
| #12 | #41 | 55h |
| #13 | | |
| #14 | | |
| #15 | ~~#15~~ | ~~AAh~~ | ←(5E) ERASE STORED DATA
| #16 | ~~#16~~ | ~~AAh~~ | ←(5F) ERASE STORED DATA
| #17 | #34 | 55h |
| #18 | #42 | 55h |
| #19 | #26 | 55h |
| #20 | #35 | 55h |
| #21 | | |
| #22 | #43 | 55h |
| #23 | #36 | 55h |
| #24 | #37 | 55h |
| #25 | | |
| #26 | #1 | 55h |
| #27 | #44 | 55h |
| #28 | #38 | 55h |
| #29 | #39 | 55h |
| #30 | #50 | 55h |
| #31 | #45 | 5Ah |
| #32 | #6 | 5Ah |
| #33 | #15 | 5Ah |
| #34 | #16 | 5Ah |

<CURRENT WRITTEN MARK (WM)>
2nd WM : 5A

←(5A) COPY STORED DATA IN PHYSICAL BLOCK OF PBA#6
←(5B) COPY STORED DATA IN PHYSICAL BLOCK OF PBA#15
←(5C) COPY STORED DATA IN PHYSICAL BLOCK OF PBA#16

105

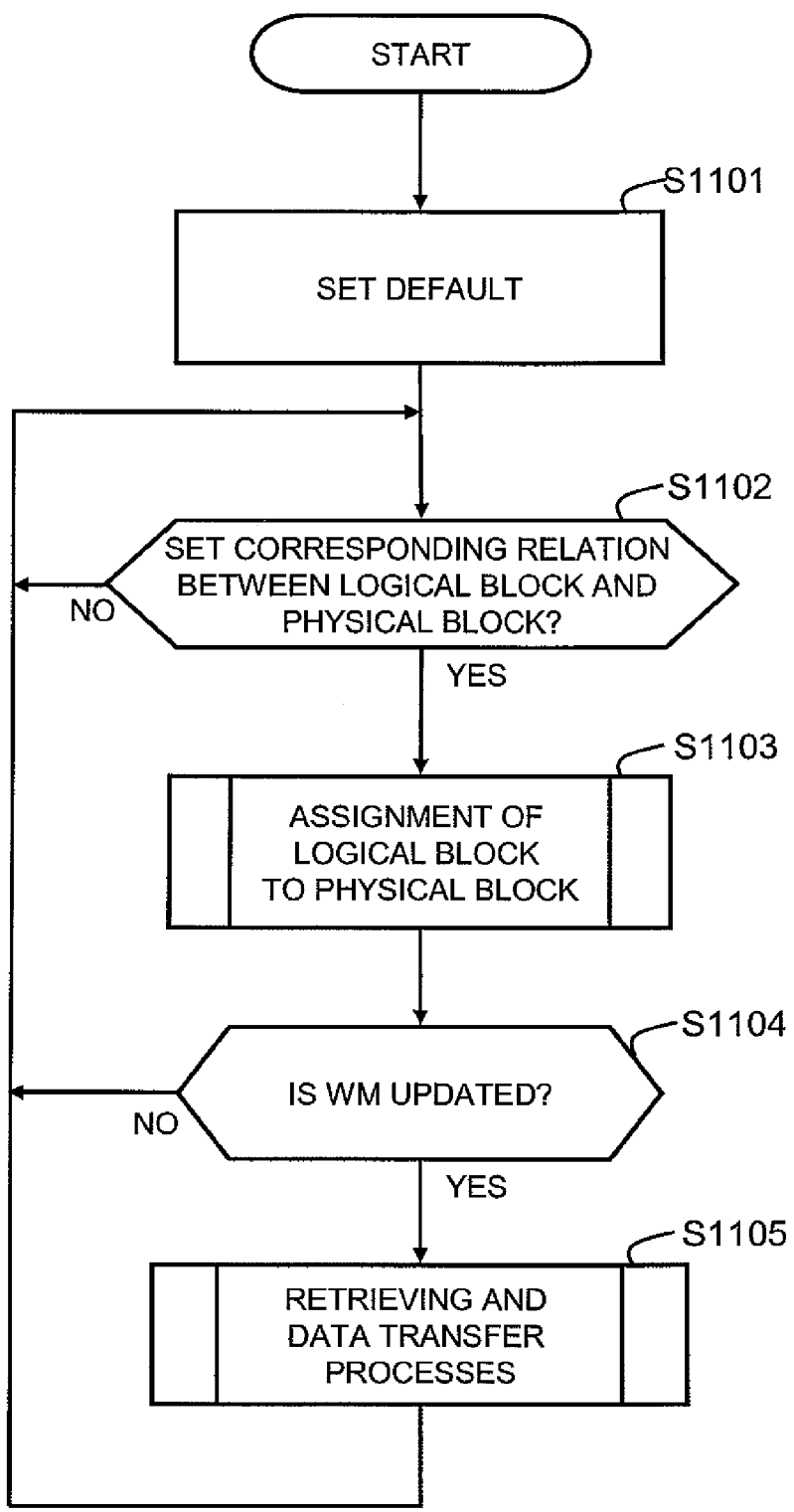

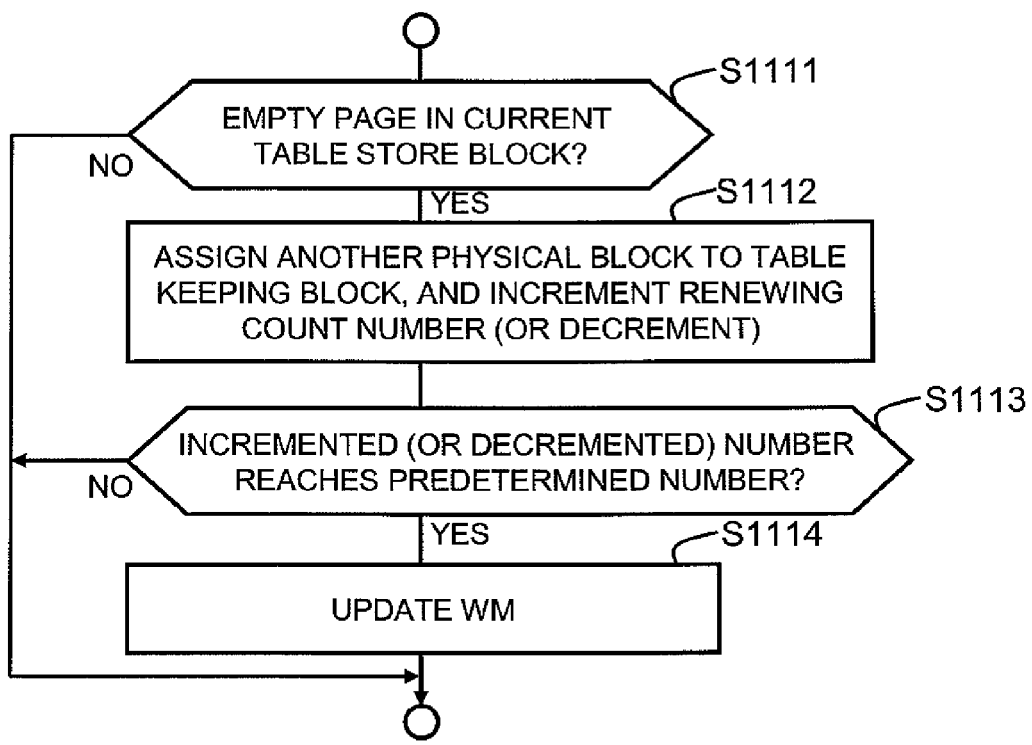

| PBA | LBN | WM OR SWITCHING COUNT NUMBER |
|---|---|---|
| #0 | — | 00h |
| #1 | — | 01h |
| #2 | #22 | 55h |
| #3 | #32 | 55h |
| #4 | #19 | 55h |
| #5 | | |
| #6 | #6 | AAh |
| #7 | #40 | 55h |
| #8 | #23 | 55h |
| #9 | #33 | 55h |
| #10 | #24 | 55h |
| #11 | #25 | 55h |
| #12 | #41 | 55h |
| #13 | | |
| #14 | | |
| . | . | . |
| . | . | . |
| . | . | . |

MEMORY CONTROLLER, FLASH MEMORY SYSTEM WITH MEMORY CONTROLLER, AND CONTROL METHOD OF FLASH MEMORY

BACKGROUND

1. Field of the Invention

The present invention generally relates to a memory controller for a flash memory, a flash memory system having the memory controller, and a method of controlling the flash memory.

2. Description of the Related Art

As shown in Reference 1, in a memory system employing the flash memory, for example, a wear-leveling control is conducted so that writing/reading does not converge on a particular physical block. There are mainly two modes of the wear-leveling controls.

One is a wear-leveling control mode (Dynamic-wear leveling mode) in which physical blocks storing a data that has not been written are left, and the remaining physical blocks (namely physical blocks which are often written) are controlled so that the average number of writing (hereinafter "writing numbers") for the remaining blocks could be even. The other is a wear-leveling control mode (Static-wear leveling mode) in which all physical blocks including physical blocks storing less frequently written data (LFWD) are controlled so that average writing numbers for the all blocks could be even.

Herein, where the number of physical blocks storing the LEWD is small (negligible), the dynamic-wear leveling mode is suitable. On the other hand, where the number of physical blocks storing the LFWD is large (significant), the static-wear leveling mode is suitable. Accordingly, Reference 1 describes to selective choosing of the dynamic-wear leveling mode, the static-wear leveling mode, or the combination of the two modes corresponding to frequency of writing data recorded in the memory system, or put another way, according to a number of physical blocks storing the LFWD. Reference 1: JP Application Publication 2007-133683

However, it is not always easy for users to select a proper wear leveling mode according to the frequency of writing data in the memory system.

Also, Reference 1 describes that a user is expected to select the mode or other conditions. Therefore, the user is subject to choose the proper mode and to arrange conditions for the memory system. This is burdensome for the user. In a case where a wrong mode is chosen, unnecessary data transfers will be frequently executed. For example, the static-wear leveling mode is chosen even though there is little physical recording data to be written.

Considering the above drawback, the present invention is directed to a memory controller, a flash memory system, or a control method for controlling the flash memory in which the wear-leveling mode is to be selected only when there are physical blocks storing less frequently written data (the LFWD as mentioned above).

SUMMARY

The memory controller updates a count number based on a new assignment of a logical block to a physical block, and writes count information in a physical block to which any logical blocks is newly assigned. The count information is defined by the count number. The memory controller decides, based on the count number and the count information stored in each physical block, whether or not to transfer stored data in a physical block to another physical block. When the memory controller decides to transfer (positive), the controller transfers the stored data in a physical block which is storing specific count information to another physical block. Otherwise, the memory controller stores an updated address mapping table in a physical block (a table storing block) when the address mapping table is updated. The memory controller updates the count number which coincides with count number stored in a physical block which was assigned as the table storing block and is not having an empty area, and writes a latest count number which is the updated count number to a physical block which is newly assigned as the table storing block, when the table storing block is newly assigned. The memory controller decides a version-information based on the latest count number and writes the version-information in a physical block to which any logical blocks is newly assigned. The memory controller decides, based on the version-information stored in each physical block, whether or not to transfer the stored data in a physical block to another physical block.

BRIEF DESCRIPTION OF THE DRAWINGS

Following is a brief description of the drawings.

FIG. 3 shows procedures where a logical block is newly assigned to a physical block.

FIG. 4 shows procedures of the wear-leveling control in a case where the physical block which stores the LFWD is found.

FIG. 7A shows updating rules of a written mark; FIG. 7B shows procedures to be performed where a logical block is newly assigned to a physical block.

FIG. 8 shows procedures of a data transfer in a case where a physical block storing the LFWD is found.

FIG. 9 shows a flowchart of procedures with regard to an embodiment of the invention.

FIG. 10A shows a diagram of the flash memory that has physical blocks with the written mark and physical blocks storing a updating count number in random.

FIG. 10B shows procedures of a first example in which the written mark is updated.

DETAILED DESCRIPTION

Preferred embodiments of the present invention will be described below in detail with reference to the drawings.

Embodiment 1

Figure 1:
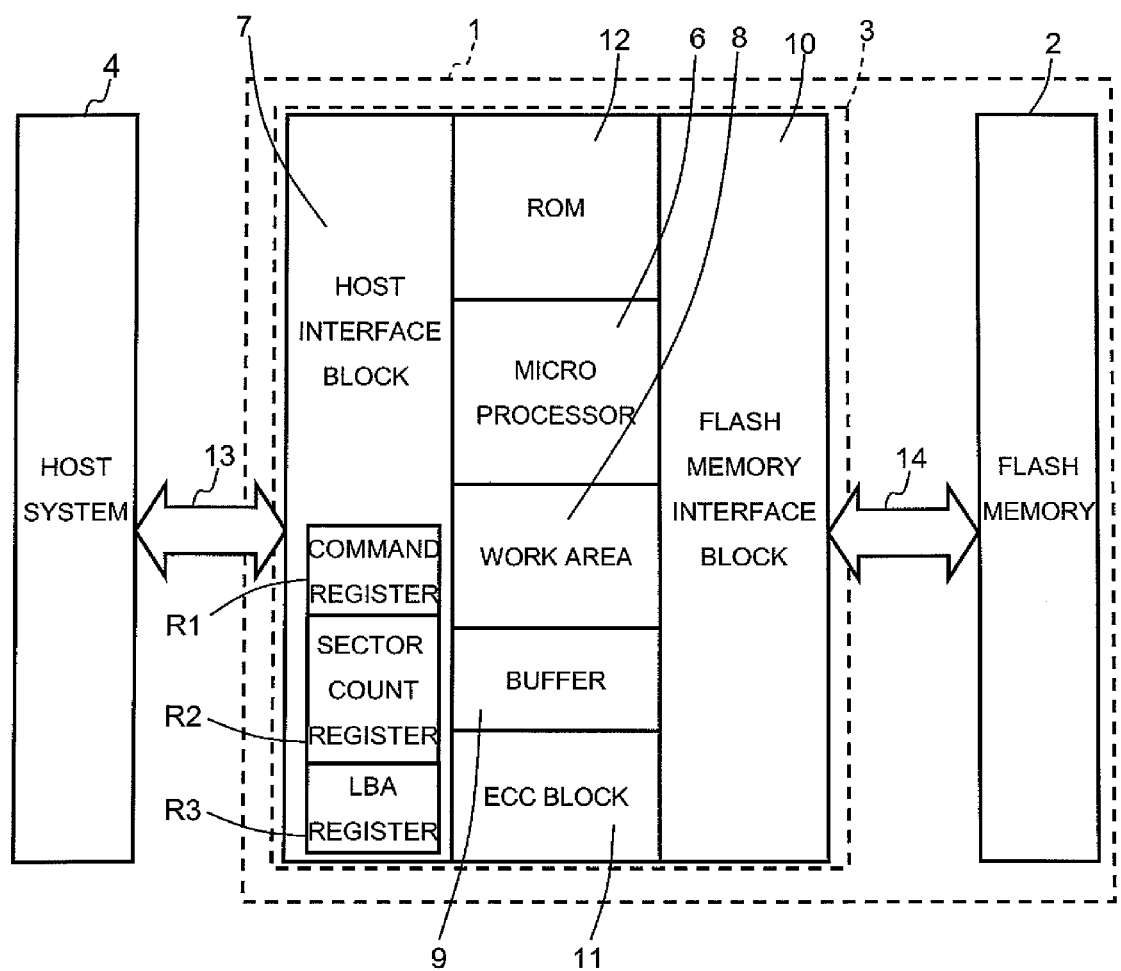
FIG. 1 shows a schematic structure of the flash memory with respect to a first embodiment of the invention.

FIG. 1 is a block diagram schematically illustrating the structure of a flash memory system 1 with respect to a first embodiment of the invention.

As shown in FIG. 1, the flash memory system 1 is comprised of a flash memory 2 and a memory controller 3 for controlling the flash memory 2.

The flash memory system 1 is connected to a host system 4 through an external bus 13. The host system 4 is comprised of a CPU (Central Processing Unit) for controlling the overall operation of the host system 4, a companion chip for exchange of information with the flash memory system 1, and so on. The host system 4 may be one of various information processing devices, for example, a digital still camera or a personal computer (PC), which are able to process various types of information such as text, audio, or image data.

The memory controller 3 is composed, as shown in FIG. 1, of a micro processor 6, a host interface block 7, a work area 8, a buffer 9, a flash memory interface block 10, an ECC (Error Correcting Code) block 11, and a ROM (Read Only Memory) 12. The memory controller 3 is connected to the flash memory 2 through an internal bus 14. The above functional blocks composing the memory controller 3 are assembled on a single semiconductor chip. Hereinafter, each functional block will be described.

The host interface block 7 exchanges (sends or receives) data address information, status information, or external commands etc. with the host system 4. The external command is a command for the host system 4 to instruct the flash memory system 1 to execute data processing. Other data including data supplied to the flash memory system 1 from the host system 4 is stored in an internal area of the flash memory system 1, for example the buffer 9, enters through the host interface block 7. In addition, data supplied to the host system 4 from the flash memory system 1 exits through the host interface block 7 as an exit.

The host interface block 7 has a command register R1, a sector count register R2, and an LBA register R3. Data supplied from the host system 4 is stored in the command register R1, the sector count register R2, and the LBA register R3. An external command, such as a writing command or a reading command etc., is stored in the command register R1. A sector count of an access target area is stored in the sector count register R2. An LBA (Logical Block Address), described later, which is at the top of the access target area is written in the LBA register R3.

A work area 8 is a work area in which data necessary for control of the flash memory 2 is temporarily stored, and the area 8 is composed of a plurality of SRAM (Static Random Access Memory). The work area 8 (aforementioned) stores various data, for example, an address mapping table illustrating correspondences between the logical blocks and physical blocks or other data.

The buffer 9 retains data which was read from the flash memory 2 until the host system 4 becomes ready to receive the data. Also, the buffer 9 retains data which is to be written in the flash memory 2 until the flash memory 2 becomes ready to store the data.

The flash memory interface block 10 exchanges data, address information, status information, and internal commands etc. with the flash memory 2 through the internal bus 14. Herein, the internal commands are commands for the memory controller 3 to instruct the flash memory 2 to execute data processing. The flash memory 2 operates according to the internal commands supplied from the memory controller 3.

The ECC block 11 generates error correcting codes (ECC) which are added to data stored in the flash memory 2. Also, the ECC block 11 retrieves and corrects an error which is included in the read data based on an ECC that has been added to the read data.

The ROM 12 is a nonvolatile storage element and stores programs for controlling operations by the microprocessor 6. The ROM 12 stores, for example, a program defining a protocol to generate the address mapping table and so on.

The microprocessor 6 controls overall operations of the memory controller 3 in accordance with programs stored in the ROM 12. For example, the microprocessor 6 instructs the flash memory interface block 10 to execute data processing in accordance with command sets defining several data processes, the command sets being read from the ROM 12.

The flash memory 2 is a NAND type flash memory. The NAND type flash memory has a register and a memory cell array in which a plurality of memory cells are arranged two dimensionally. The memory cell array has a plurality of memory cell groups and word lines. In the embodiment, the memory cell group is composed by arranging a plurality of memory cells in series. Each word line functions to select a particular memory cell in a memory cell group. A writing data process in a memory cell selected by the register is executed between the register and a memory cell selected by the word line. Similarly, a reading data process from a selected memory cell to a register is also executed between the register and a selected memory cell through the word line.

The NAND type flash memory reads and writes data as each unit of a page. On the other hand, the NAND type flash memory erases data as each unit of a block (a physical block). The physical block is composed of a plurality of pages (physical pages). For example, one physical page is composed of a user area with a predetermined size (e.g. 2048 bytes) and a redundant area with a predetermined size (e.g. 64 bytes). The user area functions to store data supplied from the host system 4, and is composed of predetermined numbers (e.g. four) of physical sector areas (e.g. a memory area of 512 bytes unit). The redundant area functions to store data, such as the ECC, a logical address data, a block status (flag), and a count information (aforementioned) etc.

The logical address data is used to discern a correspondence relation between the physical block and logical block. Accordingly, in a case where a physical block does not have a corresponding logical block (for example, a physical block in which data has been erased), the logical address data is not stored in the redundant area of the physical block. In addition, a "redundant area of a physical block" means a memory area which is composed of a redundant area in either single or multiple physical blocks (for example, redundant area of a front physical page).

The block status (flag) indicates a right/wrong condition of the physical block. In addition, a wrong block status which indicates as a wrong block (a physical block cannot ordinarily store data) is originally stored/embedded, by the manufacture, in the physical block has initial failure. Also, there is another manufacture which designs a flash memory to store the wrong block status (flag) in the user area.

In a writing process in this embodiment, the host system 4 writes command codes for a writing command in the command register R1. The host system 4 writes a number of sectors for data to be written (write data) in the sector number register R2 and the LBA, in LBA register R3, corresponding to a write destination address of the top of the write data. A logical access area as an access target is selected based on the data that was written in the sector number register R2 and the LBA register R3. Data supplied from the host system 4 is written (stored) in a physical block which corresponds to a logical block including the selected logical access area.

Where a logical access area which was selected based on the data written in the sector number register R2 and LBA register R3 covers several logical blocks, a destination to write data is the several logical blocks. Accordingly, where the logical access area covers several logical blocks, the writing process of data is executed by each logical block to which the logical access areas belong. For example, the logical access area covers two different logical blocks (a first logical block and a second logical block), the writing process to the first logical block and the writing process to the second logical block are respectively executed. Data which was instructed to be written in a logical access area belonging to the first logical block is written in a physical block corresponding to the first logical block. Data which was instructed to be written in a logical access area belonging to the second logical block is written in a physical block corresponding to the second logical block.

An address space in the host system 4 is controlled by an LBA (Logical Block Address). The LBA is sequential numbers which correspond to divided areas by units of a sector (512 bytes), hereinafter referred to as a logical sector area. Further, a logical block is formed with a plurality of the logical sector areas. One or plural physical blocks are assigned to the logical block.

In general, the correspondence relation between the logical block and the physical blocks are managed by a zone unit. Specifically, a single logical zone is composed of a plurality of logical blocks, and a single physical zone is composed of a plurality of physical blocks. The correspondence relation is often controlled by linking the logical zone(s) with the physical zone(s).

However, such a managing method has a drawback. In short, when accesses for reading/writing data become concentrated in a particular logical zone, a writing number (a number of writing) of a physical block belonging to the physical zone corresponding to the particular logical zone becomes greater than a writing number of a physical block which belongs to another physical zone. Such a situation is not suitable in view of access control efficiency.

As a resolution of the above drawback, it is possible to assign sequential logical blocks having sequential logical block numbers (LBN: Logical Block Number) in separate logical zones. The LBN is a series of numbers arranged in each logical block.

However, when many accesses come to a particular logical block, in other words, in a case where the logical blocks which are busy for accesses do not belong to multiple logical zones, a writing number of a physical block corresponding to the logical block that the logical zone includes becomes greater than a writing number of another physical block belonging to another physical zone. In such a condition, it is preferable not to initially assign (or not to restrict) physical blocks which can be related to any logical blocks belonging to any logical zones. In short, it is proper not to configure the physical zone, and it is proper to arrange the logical blocks to be able to link any physical blocks.

Additionally, an address mapping table generally manages a corresponding relation between the logical blocks and the physical blocks, the address mapping table storing the corresponding relation between one of the logical blocks and one of the physical blocks respectively. When the corresponding relation between these blocks changes, a update process of the address mapping table is executed in the work area (SRAM) 8. In general, the address mapping table is generated based on the logical address data which is stored in the redundant area of any physical blocks on the timing of a boot or an access. However, it is also possible to store the address mapping table in the flash memory 2 in advance, then to obtain the table from the flash memory 2. With storing the address mapping table in the flash memory 2, it is realized to quickly obtain the address mapping table compared with the above process of obtaining the logical address data out of the redundant area in each a physical block and generating the address mapping table. Especially, it is proper to store the address mapping table in the flash memory 2 in the above case where the logical blocks respectively belonging to the logical zones are freely linked with any physical blocks.

In addition, where the flash memory 2 stores the address mapping table, in order to prepare for an unexpected power off, it is proper to keep updating the table in the flash memory 2 so that recent data is saved in the flash memory 2. Namely, it is better to store an updated address mapping table in the flash memory 2 whenever the corresponding relation between the logical blocks and physical blocks changes (in other words, every time on which the address mapping table is updated in the work area 8). In view of preserving time for storing the address mapping table in the flash memory 2, it is better to store the table in units of the logical zones in order to reduce the number of the logical blocks belonging to each logical zone.

Figure 2:
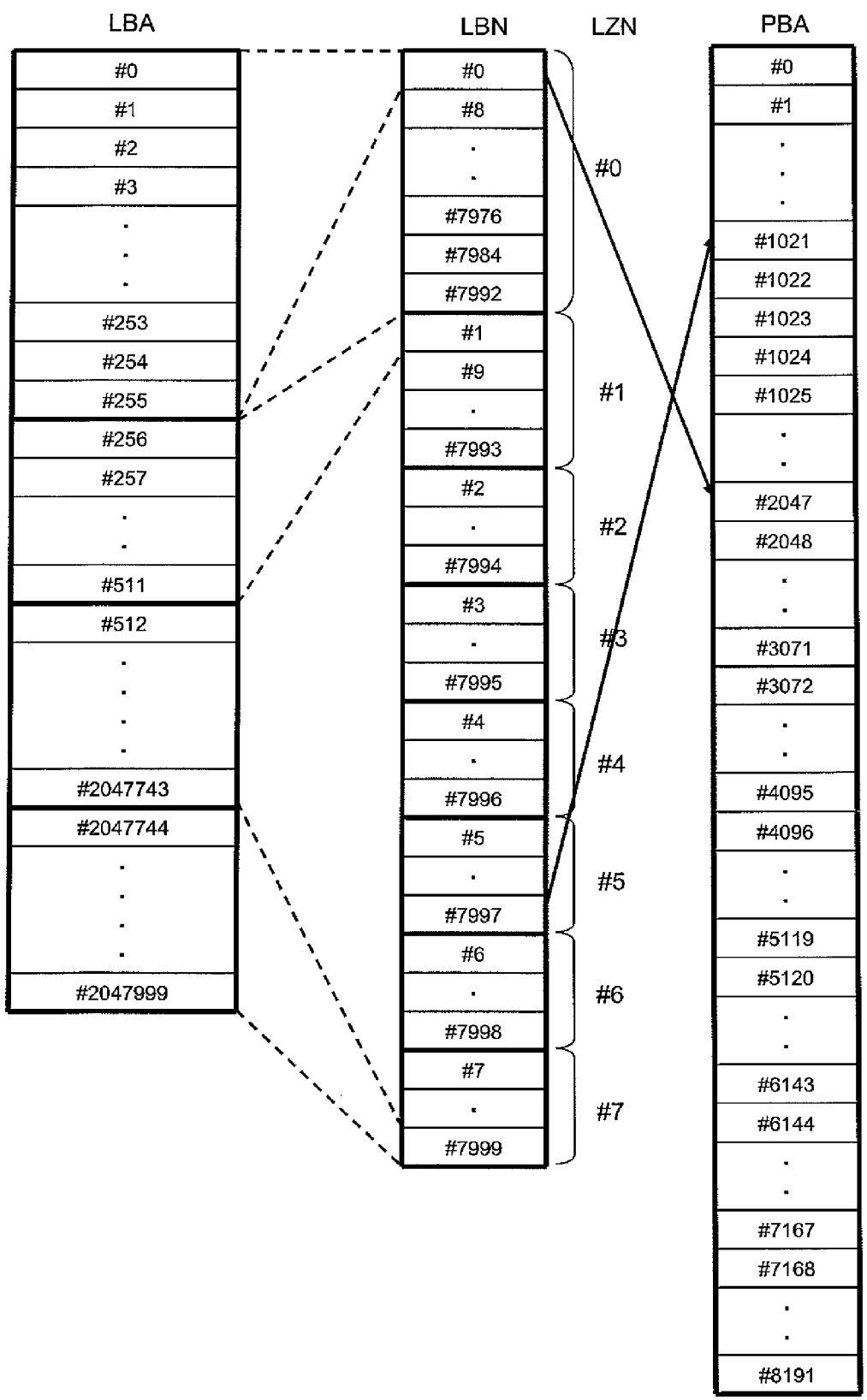
FIG. 2 shows a correspondence between logical blocks and physical blocks.

In the present embodiment, as shown in FIG. 2, the logical zones are formed, but no physical zone is formed. All the physical blocks are able to be assigned to one of any logical zones regardless of the logical zones. Accordingly, it is possible to assign any logical blocks to any physical blocks.

Referring to FIG. 2, the corresponding relation between the logical blocks and physical blocks is discussed.

As shown in FIG. 2 illustrating the present embodiment, logical sector areas ranging from LBA #0 to #2047999 (total number of 204800) are assigned in a memory area of the Flash memory 2 which is composed of 8192 physical blocks.

In FIG. 2, 256 logical sector areas having sequential logical block addresses (LBA) are grouped as one logical block. The above logical block numbers (LBN) are respectively assigned to the logical blocks. For example, 256 logical sector areas (LBA from #0 to #255) belong to a logical block, LBN #0. Other 256 logical sector areas (LBA from #256 to #511) belong to a logical block, LBN #1. Similarly, all the 2048000 logical sector areas ranging from LBA #0 to #2047999 belong to one of any logical blocks from LBN #0 to #7999 (total number of 8,000).

Further, plural logical blocks are grouped as a logical zone. The logical zone number (LZN), discussed above, is assigned to each of the logical zones. FIG. 2 shows that the logical blocks having sequential LBN are apportioned to one of any 8 logical zones from LZN#0 to LZN#7 in turn so that these logical blocks belong to different logical zones. For example, logical block LBN #0 is apportioned to logical zone LZN #0. Logical block LBN #1 is to logical zone LZN #1, and logical block LBN #2 is to logical zone LZN #2. With such a rule, all logical blocks are apportioned up to logical zone LZN #7. Further, in the same manner, logical block LBN #8 is apportioned to logical zone #0, logical block LBN #9 to logical zone LZN #1, logical block LBN 410 to logical zone LZN #2. With such a rule of apportioning, it is realized to reduce a probability in which frequently written logical blocks are concentrated in a particular logical zone. Accordingly, it is possible to prevent a frequency of writing/updating a physical block in which the address mapping table (as a table storing block) is stored from raising much higher than a frequency of writing another table storing block. The two table storing blocks correspond to different logical zones.

The flash memory 2 is composed of, for example, 8192 physical blocks. The 8192 physical blocks respectively have unique physical block addresses (PBA). The flash memory 2 might initially have defective physical blocks at shipping. In addition, there might be (acquired) defective physical blocks in the flash memory 2 because of deterioration after being used even though these blocks were fine at shipping.

In the NAND type flash memory, a data reading process and a date writing process is executed as a page unit, and a data erasing process is executed as a physical block unit (unit of a physical block). The data erasing process is executed as below:

1) when data stored in a physical block corresponding to a logical block to which the logical access area belongs (hereinafter as a "designated logical block") is completely overwritten by data which has been stored in another physical block; or
2) when the newest data which corresponds to data stored in a physical block corresponding to the designated logical block is stored to another physical block, and the all data stored in the physical block is completely overwritten by the data which has been recorded in another physical block. Namely, in a case where the entire data which was stored in the physical block corresponding to the designated logical block is completely overwritten by data stored in another physical block, the data which was stored in the physical block is erased, and the corresponding relation between the logical block (the designated logical block) and the physical block is updated, the corresponding relation being stored in the above mentioned address mapping table. Further, when an empty physical block (a physical block to which a logical block has not been assigned) is retrieved, for example, a retrieving process is executed in which physical blocks are searched from the top physical block toward the bottom physical block in the flash memory 2 in turn. Consequently, an empty physical block which is detected first is assigned as the designated logical block.

As discussed above, when the writing process of data in a physical block is executed, a logical block is newly assigned to another physical block (an empty physical block) from the physical block in which the date was stored, the newly assigned logical block corresponding to the data-transferred physical block. Put another way, when data stored in a first physical block corresponding to a first logical is transferred to a second physical block, the first logical block is also assigned to the second physical block. In addition, where there is no physical block corresponding to a designated logical block, a logical block is newly assigned to an empty logical block.

The present embodiment shows that the memory controller 3 has a count function which increments a count number every time a logical block is newly assigned to a physical block. Particularly, for example, the microprocessor 6 plays a role as a counter (the count function) and increments the count number every time when the microprocessor 6 newly assigns a logical block to a physical block. The count number is stored in the memory area of the memory controller 3, for example the work area 8 (a nonvolatile memory such as SRAM), and the count number stored in the work area 8 is incremented. The count number stored in the work area 8 is copied to the flash memory 2 at a predetermined opportunity, for example, every time when a number of updating the count number reaches a predetermined number (for example, when the count number reaches a predetermined number). When the power for the memory controller 3 is turned off, the count number stored in the work area 8 is erased. On the other hand, a count number stored in the flash memory 2 is read and stored in the work area 8 when the power for the memory controller 3 is turned on. Then, the count number in the work area 8 is kept incremented. It is not necessary to always increment the count number. It might be practical to decrement or to manage the number by other rules. In the present embodiment, the count number is updated when a logical block is newly assigned to a physical block. However, it is not necessary to limit the timing of updating in the embodiment. It might be practical to update the count number when data in the physical block is erased. Further, it is also practical that the memory controller 3 has a memory area composed of a nonvolatile RAM, such as FeRAM (Ferroelectric Random Access Memory) or MRAM (Magnetic Random Access Memory) and that the count number is stored in the memory area. In a case where the count number is stored in such a nonvolatile memory, it is possible to directly update the count number in the nonvolatile RAM, and it is not necessary to copy the count number to the flash memory 2.

When a logical block is newly assigned to a physical block, logical address data indicating the newly assigned logical block and count information based on old count information before a count increment (or a new count number after a count increment) are stored in a redundant area of the physical block to which the logical block was newly assigned. Particularly, for example, as shown FIG. 3, a logical block number (LBN), as logical address data indicating an assigned logical block is written in the redundant area 105 of the physical block to which the logical block is newly assigned. The top three bytes among four bytes of the count number prior to the increment, as count information, are written in the redundant area 105.

Described more particularly, as a reference number (3A) shows in FIG. 3, where a count number (in hexadecimal) is "00 00 3F FAh," and a logical block of LBN #40 is newly assigned to a physical block of PBA #7 which was retrieved as an empty block, the LBN "#40" for the newly assigned logical block and the count number "00 00 3Fh" which is the top three bytes of the count number prior to the count increment are stored in a redundant area 105 of the physical block, the PBA #7. Then, the count number, "00 00 3F FAh" (in hexadecimal) is counted up (incremented) to "00 00 3F FBh."

Next, for example, as a reference number (3B) shows, where a logical block, LBN #41, is newly assigned to a physical block, PBA #12, which was retrieved as an empty physical block, the LBN "#41" for the newly assigned logical block and the count information "00 00 3Fh" which is the top three bytes of the count number prior to the increment are stored in the redundant area 105 of the physical block, the PBA #7. Then, the count number, "00 00 3F FBh" is counted up (incremented) to "00 00 3F FCh."

After that, similarly, every time when a logical block is newly assigned to a physical block, an LBN of the logical block which was assigned and count information which is the top three bytes of the count number prior to the count increment are written in the redundant area 105 of the physical block to which the logical block was newly assigned, then the count number is incremented. For example, as shown in (3C), where a logical block LBN#42 is assigned to a physical block PBA#18. The LBN "#42" and count information "00 00 3Fh" are written in the redundant area 105 of the physical block PBA#18. Then, the count number is incremented from "00 00 3F FCh" to "00 00 3F FDh." Following the process, as shown in (3D), where a logical block LBN#43 is assigned to a physical block PBA#22, the LBN "#43" and count information "00 00 3Fh" are written in the redundant area 105 of the physical block PBA#22. Then, the count number is incremented from "00 00 3F FDh" to "00 00 3F FFh." Next, as shown in (3E), where a logical block LBN#44 is assigned to a physical block PBA#27. The LBN "#44" and count information "00 00 3Fh" are written in the redundant area 105 of the physical block PBA#27. Then, the count number is incremented from "00 00 3F FEh" to "00 00 3F FFh." Next, as shown in (3F), where the logical block LBN#45 is assigned to the physical block PBA#31, the LBN "#45" and count information "00 00 3Fh" are written in the redundant area 105 of the physical block PBA#31. Then, the count number is incremented from "00 00 3F FFh" to "00 00 40 00h."

In addition, the retrieving process to retrieve an empty physical block is executed for all physical blocks used as physical blocks in the physical zones or as the memory area of the host system, wherein the empty physical block to which a logical block is newly assigned. In a case where the retrieving process targets physical blocks in the physical zone, the process is executed to retrieve an empty block in the physical zone in turn from the top of the zone to the bottom. In a case where the retrieving process targets all physical blocks which are used as the memory area of the host system, the process is executed for the all physical blocks in the memory system to retrieve an empty block in turn from the top of the physical block to the bottom. Accordingly, due to the repeating retrieving process with respect to physical blocks included in the target of the retrieving process, in which the retrieving process is repeatedly executed to retrieve an empty block in the order from the top of the physical block to the bottom, it is expected to even the writing numbers of the physical blocks in the target of the retrieving process (in other words, the writing numbers of the physical blocks in the target of the retrieving process could be near even) unless there is a physical block storing the less frequently written data (LFWD).

According to the above explanations, in a case where 8192 logical blocks are newly assigned to a physical block, the count number is raised from 0 (00 00 00 00 in hexadecimal) to 8192 (00 00 20 00 in hexadecimal) in a process of writing data. Further, where logical blocks are newly assigned to physical blocks, the top three bytes of the count number are stored as the count information in the redundant area 105 of each physical block. Accordingly, the redundant area 105 of each of the physical blocks respectively stores one of any count information from "00 00 00h" to "00 00 1Fh."

Then, where 8192 logical blocks are further newly assigned, the count number is raised from 8192 (00 00 20 00 in hexadecimal) to 16384 (00 00 40 00 in hexadecimal). During the process, the redundant area 105 of the physical block to which the logical blocks were newly assigned stores one of any count information from "00 00 20h" to "00 00 3Fh."

Herein, with respect to a physical block in which a count information not more than "00 00 1Fh" was stored, it is determined that no logical block was newly assigned to the physical blocks while the count number was incremented up to 8192 (00 00 20 00 in hexadecimal) from 16384 (00 00 40 00 in hexadecimal). The reason is because the redundant areas 105 to which a logical block was newly assigned during the period must store one of any numbers from "00 00 20" to "00 00 3F" as count information, and the redundant area 105 never stores count information not more than "00 00 1Fh." Also, where a total number of the physical blocks is assumed to be 1024, the example in FIG. 2 shows the number, 8192. However, in order to simplify the explanation hereinafter, the total number is assumed 1024, the physical blocks are estimated to be newly assigned to logical blocks at least eight times (8192 divided by 1024) during the period.

In the embodiment, for example, when the count number is raised to 16384 (00 00 40 00 in hexadecimal), the retrieving process for retrieving a physical block in which the LFWD is stored is executed. Particularly, the retrieving process is to retrieve a physical block having a count information not more than "00 00 1Fh" (for example, such a physical block will be detected in the retrieving process executed from the top physical block to the bottom physical block. It is not necessary to detect only a single physical block during the process. It is possible to detect multiple physical blocks during the process). Then, when such a physical block (a physical block storing the LFWD) is retrieved, the data stored in the physical block is transferred and copied to another physical block. Particularly, a retrieving process for an empty block is executed, the empty block being a physical block to which the data stored in the retrieved physical block is transferred (hereinafter, the empty block as a transferred physical block, the retrieved physical block as a transferring physical block). The logical block to which the transferring physical block has been assigned is newly assigned to the transferred physical block retrieved by the retrieving process. The data which has been stored in the transferring physical block is transferred to the transferred physical block. Then, the logical block number LBN of the newly assigned logical block (the LBN of the transferring physical block) and the count information which is the top three bytes of the count information prior to the increment are stored in the redundant area 105 of the transferring physical block. Then, the data stored in the transferring physical block and some additional data such as the LBN and the count information etc. is erased. The additional data was stored in the redundant area 105 of the transferring physical block. In short, the stored data in the user area of the transferring physical block and the additional data stored in the redundant area are erased at once. Additionally, the count number of the transferring physical block is incremented because a logical block is newly assigned to the physical block. Hereinafter, it will be described more specifically referring to FIG. 4.

When the count number is raised to 16384 (00 00 40 00 in hexadecimal), the retrieving process starts in order to retrieve a physical block storing count information not more than "00 00 1Fh." By the retrieving process, a physical block, PBA #6, storing "00 00 1Ah" is initially detected. In the process, stored data in the physical block, PBA #6 (first physical block), is transferred and copied to a physical block, PBA #34 (second physical block), which was detected as an empty physical block. In addition, the LBN "#6" of the logical block which was assigned to the first physical block, PBA #6, and the count information "00 00 40h" which was the top three bytes of the count number prior to the count increment, are written to the redundant area 105 of the second physical block, PBA #34. See (4D). Then, stored data in the first physical block, PBA #6, and the additional data stored in the redundant area 105 of the first physical block, PBA #6, such as LBN "#6" and count information "00 00 1Ah" are erased. See (4A). The count number is incremented from "00 00 40 00h" to "00 00 40 01h."

Then, a physical block, PBA #15, storing "00 00 10h" is retrieved. In the process, the stored data in the physical block, PBA #15, is transferred and copied to a physical block, PHA #35, which was detected as an empty physical block. In addition, the LBN "#15" of the logical block which was assigned to the physical block, PBA #15, and the count information "00 00 40h" which was the top three bytes of the count number prior to the count increment, are written to the redundant area 105 of the physical block, PBA #35. See (4E). Then, the stored data in the physical block, PBA #15, and the additional data stored in the redundant area 105 of the physical block, PBA #15, such as the LBN "#15" and the count information "00 00 10h" are erased. See (4B). The count number is incremented from "00 00 40 01h" to "00 00 40 02h."

Then, a physical block PBA #16 storing "00 00 01h" is retrieved. In the process, the stored data in the physical block, PBA #16, is transferred and copied to a physical block, PBA #36, which was detected as an empty physical block. In addition, the LBN "#16" of the logical block which was assigned to the physical block, PBA #16, and the count information "00 00 40h" which was the top three bytes of the count number prior to the count increment, are written to the redundant area 105 of the physical block, PBA #36. See (4F). Then, the stored data in the physical block, PBA #16, and the additional data stored in the redundant area 105 of the physical block, PBA#16, such as LBN "#16" and the count information "00 00 0Fh" are erased. See (4C). The count number is incremented from "00 00 40 02h" to "00 00 40 03h."

As discussed above, the physical blocks storing count information not more than "00 00 1Fh" are estimated to be less frequently written physical blocks (LFWB), and the wear-leveling control is executed to cover these physical block also. Particularly, a less frequently rewritten physical block refers to a physical block to which a logical block has never been newly assigned while the count number was raised from 8192 (00 00 20 00 in hexadecimal) to 16384 (00 00 40 00 in hexadecimal). Put another way, the physical block storing count information having a predetermined gap from the current count numbers is estimated as the LFWB. In a case where the top three bytes of the current number are 00 00 40h, the count information having the predetermined gap is "00 00 1Fh." It is not necessary to execute the two processes right after the count number reaches 16384 (00 00 40 00h in hexadecimal). Herein one process means the retrieving process for the less frequent rewritten physical block and the other means the data transferring process in which stored data in the first physical block retrieved in the above retrieving process is transferred to the second physical block. The two processes may be executed during an idling time (a period in which there is no access from the host system 4) after the count number reaches 16384 (00 00 40 00 in hexadecimal). In addition, when an access from the host system 4 occurs while these processes are performing, it may be practical to temporarily discontinue the processes, then to resume the processes when the host system later enters the idling status.

Then, when the count number is raised from 16384 (00 00 40 00 in hexadecimal) to 24576 (00 00 60 00 in hexadecimal), the retrieving process is executed, and retrieves a physical block storing a count information not greater than "00 00 3Fh." In a case where such a physical block is detected, the stored data in the (first) physical block is transferred to another (second) physical block.

As described above, it is preferable to execute the retrieving process for the LFWB every time when logical blocks are newly assigned at the same times as the predetermined number. The predetermined number is a multiple of an amount of the physical blocks (for example 1024) by predetermined numbers (for example, 8), 8192 (1024×8). In short, where the total number/amount of the physical blocks is N (N is integral equal to or more than 1), and where the predetermined number is K (K is integral equal to or more than 1), the retrieving process for the LFWB is executed every time the count number increases by N times K. In the above embodiment, the retrieving process for the empty physical block to which a logical block has not been newly assigned is executed during the period in which the count number is increased to N times K, then a physical block detected by the process is regarded as a physical block storing the LFWD. Further, the stored data in the physical block is transferred and copied to another physical block.

In addition, the stored data in the physical block which was regarded as the LFWB is erased after the data is transferred (copied) to another physical block, and the physical block becomes empty. The empty physical block is possibly a block which has not been often written. However, the block is likely to be written more frequently than ever because of having an erase status. On the other hand, the physical block to which the stored data was transferred has a high probability of being a physical block which has been often written. However, now the block stores the LFWB. Accordingly, the number of the stored data overwritten after the data transfer will become small. Due to such a theory, it is expected that the numbers of writing the respective physical blocks in the flash memory 2 is evened.

Additionally, the total number of all physical blocks in the flash memory is possibly calculated based on ID data (data regarding the configuration of the flash memory 2) which is stored in the flash memory 2. Particularly, for example, the ID data includes data indicating an entire recording capacity of the flash memory 2 and data indicating a block size (a recording capacity of a single physical block). Due to the data, it is possible to calculate the total number of the all physical blocks based on the entire recording capacity of the flash memory 2 and the block size. Further, the count information might include either all bits of a count number or a part of the bits. The count information must include useful data to retrieve a physical block that has not been rewritten for a predetermined period among other blocks. The predetermined period might be a period in which the count number is raised to a predetermined number. In a case where the part of the count number is used as the count information, the bit number of the count information might be defined by considering a recording capacity of the redundant area and a data capacity except for the count information written to the redundant area.

Figure 5:
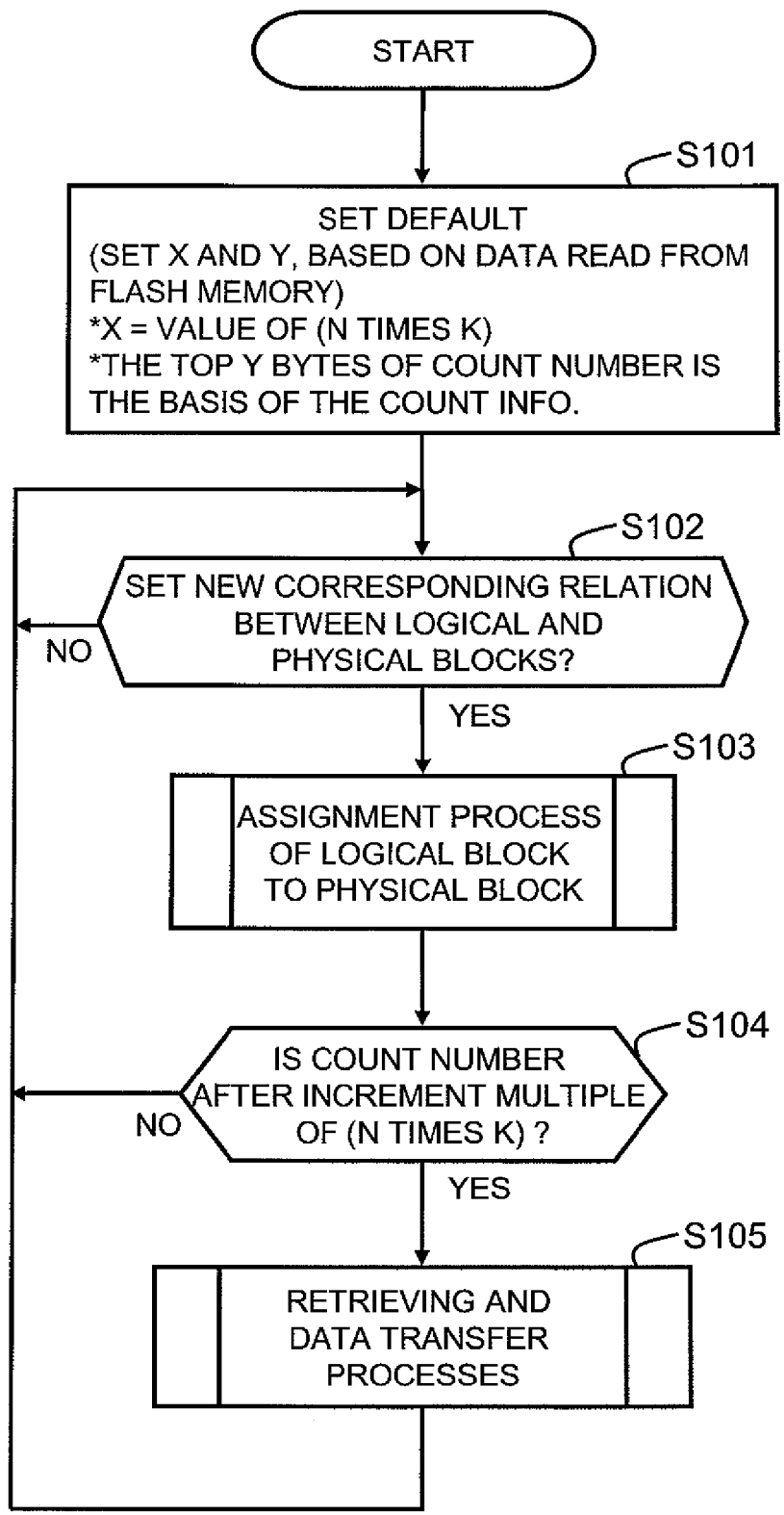
FIG. 5 shows a flowchart illustrating procedures of an embodiment of the invention.

Hereafter, the outline of the data process of the embodiment is discussed referring to FIG. 5.

When the wear-leveling control with respect to the embodiment is executed, initially, a default setting is performed (S101). Particularly, the memory controller 3 reads the ID data from the flash memory 2, then calculates a total number, N, of the physical blocks based on a block size data and an entire recording capacity derived from the ID data. Further, a rule is determined in which the above retrieving process and the data transfer process will be executed every time when the count information reaches a single or multiple amounts of the N times K, wherein K is a predetermined number. Further, every time the count information reaches the above amount of the N times K, the count information of the counter resets to zero. The predetermined number K might be fixed as a default or might be decided based on the total number, N, of the physical blocks. Also, it is freely designed how many top bytes of the count number will be used as the count information. In the above embodiment, the top three bytes of the count number are used as the count information.

After the default setting, where the memory controller 3 receives a writing command from the host system 4, the memory controller 3 decides whether or not to newly set a physical block to which a logical block corresponds, wherein a logical access area assigned by the writing command belongs to the logical block (S102). Where it is necessary (S102, YES), the memory controller 3 retrieves an empty block, and assigns the logical block to the empty block which was retrieved, wherein the logical access area assigned by the writing command belongs to the logical block (S103). Particularly, an LBN of the logical block to which the logical access area assigned by the writing command belongs and count information which is the top three bytes of the count number of the counter are written to the redundant area 105 of the retrieved empty block (a physical block). Then, the count number of the counter is incremented.

It is decided whether or not the count number of the counter which was incremented in S103 is a multiple number of N times K. The multiple number of N times K means, according to the aforementioned example (N=1024, K=8), 8192, 16384, 24576 and so on.

Where it is decided that the count number after the increment is a multiple number of N times K, (S104, YES), the retrieving process for retrieving a physical block storing less frequently rewritten data (LFWD) is executed. When a physical block storing the LFWD is retrieved, the data transfer process begins, in which the stored data in the retrieved physical block is transferred and copied to another physical block (S105). Particularly when the count number of the counter reaches the multiple number of N times K, the retrieving process begins to retrieve a physical block to which any logical blocks have not been assigned during a period in which the count number is raised to the multiple number of N times K. Namely, when the count number of the counter reaches a multiple number of (N times K), a physical block will be retrieved by the retrieving process, the retrieved physical block storing a count information which corresponds to a count number that is smaller than a number from which (N times K) was subtracted. Then, where the corresponding physical block is retrieved, all the data stored in the retrieved physical block is transferred to another physical block and is erased.

At S105, the data transfer process will not be executed unless the LFWB is detected. However, if the LFPB is detected, the data transfer process is executed. Namely, only where there are physical blocks storing the LFWD, the data transfer process in which the LFWD stored in the physical blocks is transferred to other physical blocks is executed.

The aforementioned is an explanation with respect to the embodiment.

According to the embodiment, the memory controller 3 has a counter function which is able to increment the count number every time a logical block is newly assigned to a physical block. Then, new count information is written in the redundant area 105 of the physical block to which the logical block was newly assigned, the new count information derived from the count number managed by the count function. Then, the count number is incremented after the count information is written in the redundant area 105 of the physical block.

Further, at a predetermined timing (for the aforementioned embodiment, every time the count number is raised to (N times K)), the retrieving process for a physical block storing LFWD is executed. In the process, a physical block is regarded as a physical block storing the LFWD, namely the LFWB. The physical block stores count information which have at least a predetermined difference from a portion (namely the top three bytes) indicating the count information of the count number which is controlled by the counter function. Then, the retrieving process for the physical block storing the LFWD is executed. Then, only when the LFWD is detected, the stored data in the detected LFWD is transferred (copied) to another physical block. Namely, in the embodiment, only a case where a physical block storing the LFWD exists, the wear-leveling control for physical blocks including the LFWD stored block will be executed.

Further, in the embodiment, the retrieving process condition is automatically set based on the total number "N" of the physical blocks, the total number calculated on the ID data derived from the flash memory 2. The process condition means conditional information with respect to whether or not the process of retrieving the LFWB is executed. Accordingly, the users do not need to set the condition by themselves.

Embodiment 2

Hereinafter, the second embodiment will be described. The following mainly explains differences from the above first embodiment. Explanations with respect to the common features of the first and the second embodiments are either omitted or simplified.

Figure 6:
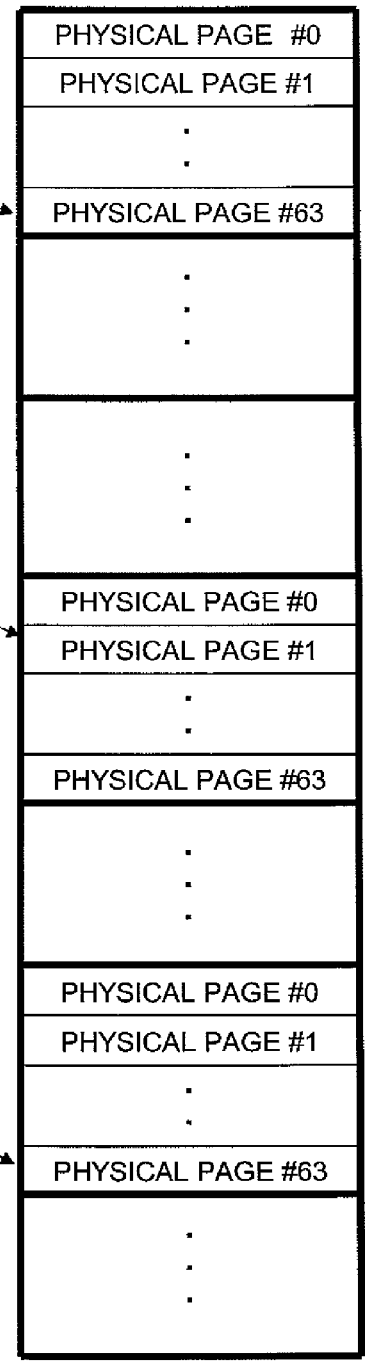
FIG. 6 shows table management data, an address mapping table, and the way to store both.

In the embodiment, as FIG. 6 shows, address mapping tables are prepared for each logical zone. Each address mapping table manages only relations in which any logical blocks correspond to any physical block. The logical blocks configure each logical block to which the logical blocks correspond. In FIG. 6, a reference numeral 103-0 indicates an address mapping table corresponding to a logical zone with a logical zone number (LZN) #0. The LZN is a serial number named to a logical zone. The reference numeral 103-1 indicates an address mapping table corresponding to the logical zone, LZN #1. The address mapping tables, 103-1 or 103-2, respectively store the logical block LBN and the physical block address (PBA) of a physical block only to which the logical block is assigned. Accordingly, the size of each of the address mapping tables for every logical zone is small compared with a case where all logical block are controlled with a single address mapping table. The address mapping table for each logical zone is stored in a different physical block. Put another way, it is not possible to store more than two address mapping tables equal to or more than two logical zones in a single physical block at once. For example, the address mapping table 103-0 corresponding to the logical zone LZN#0 is stored in the logical block PBA#5, and the address mapping table 103-1 corresponding to the logical zone LZN#1 is stored in the physical block PBA#1076. Hereinafter, the physical block to which the address mapping table is stored is named a "table store block." The address mapping table is designed to be stored, as shown in FIG. 6, in a area of a physical block used as the table store block, the area being equal to or more than one empty physical page or an empty area within the physical page, every time when the table is updated on the work area 8. For example, where a size of the address mapping table for each logical zone is set (small) enough to be stored in a single physical page, and where the address mapping tables are stored sequentially from the top of the physical block (to the bottom of the physical block) every time on which updating the address mapping tables, it is possible to store 64 address mapping tables in the table store block. In a case where there is no empty area in which the address mapping table is able to be stored, another physical block is assigned as the table transfer table. As shown in FIG. 6, where the address mapping table 103-1 occupies (a area from the top) to the bottom of the physical page #63 of the physical block PBA#1076 as the table store block for the address mapping table corresponding to the logical zone LZN#1, there is no empty area to store the address mapping table in the physical block PBA#1076. Accordingly, in such a situation, when the address mapping table 103-1 is updated, another physical block (an empty physical block) is assigned, the physical block is used as the table store block for the address mapping table 103-1. The updated address mapping table 103-2 is stored in further another physical block. Hereinafter, the process of assigning another physical block as the table store block is named a "transfer of the table store block."

Further, in the embodiment, the memory controller 3 controls data, "table control information," which indicates physical blocks in which any address mapping tables are stored, the address mapping tables corresponding to any logical zones. FIG. 6 shows that the table control information 101 includes data by which it is able to distinguish a corresponding relation between any logical zones and PBAs of the table store block of the address mapping table corresponding to the logical zone LZN. By referring to the table control information 101, for example, it is able to choose a physical block PBA#5 for the table store block of the table transfer table 103-0 corresponding to the logical zone LZN#0. It is also able to choose a physical block PBA#1076 for the table store block of the table transfer table 103-1 corresponding to the logical zone LZN#1. The table control information 101 is stored in one of any (not less than two) preset/predetermined physical blocks for storing the table control information. Such a physical block is named as a "control information block candidate." In the embodiment, physical blocks, PBA#0 and PBA#1 (namely two physical blocks), are set for the control information block candidates. Accordingly, the table control information is to be stored in one of the two physical blocks, PBA#0 and PBA#1. Hereinafter, the physical block which was chosen to store the table control information among the control information block candidates (for example, physical blocks PBA#0 and PBA#1) is named "control information block." The table control information 101 is updated on the work area 8 when the table store block of the address mapping table corresponding to one of any logical zones. Every time on which the table control information 101 is updated on the working area 8, the table control information 101 is stored in an empty area of a physical block used as the control information block (for example physical block PBA#0), wherein the empty area is composed of less than one physical page or within a single physical page. Where there is no empty area so as to store the table control information in the physical block, another physical block which had not been chosen among the control information block candidates is assigned as a new control information block. (For example, when the physical block PBA#0 was chosen first and the block did not have an enough empty area, the physical block PBA#1 is newly chosen for the control information block.) Namely, preselected two physical blocks are alternatively used as the control information blocks. Hereinafter, the process is named as "switching control information blocks."

In the embodiment, a written mark is written in a redundant area of a physical block when a logical block is newly assigned to the physical block in addition to a logical address data indicating the newly assigned logical block. The "written mark" in the embodiment is version-information which is incremented when a result by a data process with respect to newly assigning a logical block to a physical block meets a predetermined condition. The "data process with respect to newly assigning a logical block to a physical block" and the "predetermined condition" will be described hereinafter referring to other examples.

The written mark includes at least three types of data which are sequentially used in a predetermined order. Namely, the written mark is updated in the predetermined order. When the written mark reaches the last mark, and moves to the next, the written mark returns to the first mark. For example, as shown in FIG. 7A, the memory controller 3 updates the written mark in turn, first written mark "55," second written mark "5A," third written mark "A5," and fourth written mark "AA" in this order. The written mark is abbreviated "WM" in the drawings. Next to the fourth mark "AA," the written mark returns to the first written mark.

Hereinafter, according to the updating example based on the ruled which was explained referring to the FIG. 7A, processes executed in the embodiment will be described referring to FIGS. 7B and 8. In the description, a period in which the written mark is the first written mark "55h" is named "first period," a period in which the written mark is the second written mark "5Ah" is named "second period," and a period in which the third written mark "A5h," is named "third period," and a period in which the fourth written mark "AAh," is named "fourth period." Since the written mark changes as described above, the period correspondingly changes.

A physical block in which the first written mark "55h" is stored is a physical block to which a logical block was newly assigned in the first period. A physical block in which the second written mark "5Ah" is stored is a physical block to which a logical block was newly assigned in the second period. A physical block storing the third written mark "A5h" is a physical block to which a logical block was newly assigned during the third period. A physical block storing the fourth written mark "A5h" is a physical block which was assigned during the fourth period.

More particularly, for example, as shown at (4A) in FIG. 7B, when the logical block LBN#41 was newly assigned to the physical block PBA#12 which was retrieved as an empty physical block, it was executed in the first period, a redundant area 105 of the physical block PBA#12 stores the LBN#41 for the newly assigned logical block and the first written mark 55h.

Next, as shown at (4B), when a logical block LBN#42 is newly assigned to a physical block PBA#18 which was retrieved as an empty physical block, the redundant area OS of the physical block PBA#18 stores LBN#42 of the newly assigned logical block and the first written mark, 55h since the process was executed during the first period.

Then, as (4C) and (4D) indicate, logical blocks are newly assigned to physical blocks. Each time for the processes is within the first period. Therefore, the redundant area 105 of the physical block to which a logical block was newly assigned stores the LBN of the newly assigned logical block and the first written mark, 55h.

In case of (4D), namely, where the logical block LBA#44 is assigned to the physical block PBA#27 and where it is presumed that the result of the process with respect to the assignment meets a predetermined condition, the written mark is updated from the first mark "55h" to the second mark, 5Ah. At this timing, the first period is terminated and the second period begins.

Accordingly, as (4E) indicates, when the logical block LBN#45 is assigned to the physical block PBA#31 which was retrieved as an empty physical block, since it is in the second period, the redundant area 105 of the physical block PBA#31 stores LBN#45 of the newly assigned logical block and the second written mark, 5Ah.

As discussed above, the written mark which is written and stored in the redundant area of the physical block differs in accordance with periods in which the logical block is newly assigned to the physical block.

In addition, the retrieving process in order to retrieve a physical block to which a logical block is newly assigned is executed targeting all physical blocks which are likely to be used as a memory area of the host system 4. During the process, the empty block retrieving process is executed for the all targeted physical blocks in a sequential order, from the top physical block to the bottom of the physical block (alternatively, or one block by one block). In this manner, due to the empty block retrieving process which is repeatedly executed from the top physical block to the bottom physical block where there are not physical blocks storing data which has been rarely rewritten (the less frequent rewritten data), the rewritten numbers of physical blocks which are targeted by the retrieving process are expected to be almost even.

The memory controller 3 executes the above retrieving process at a predetermined timing, for example, at a timing when the written mark is updated. Due to the process, a physical block which has not been updated for more than at least a period is able to be retrieved. The term "updated" means to write new data after the stored data was erased. Put another way, the physical block is to be detected, the physical block to which the logical block has not been newly assigned for a certain period since the current assigned logical block was previously assigned.

For example, a physical block which has not been updated for a certain period (one period) is retrieved. In the process, a physical block in which a written mark corresponding to a previous period more than two cycles ago was stored is retrieved. As shown FIG. 8, where the current written mark is the second written mark 5Ah, it indicates the second period. Therefore, the physical blocks storing written mark AAh (fourth period) or written mark A5h (third period) are assumed to not be written in the first period which is older than the second period by one period. Accordingly, when the current written mark is the second written mark 5Ah, the physical blocks storing fourth written mark AAh or third written mark A5h will be retrieved, the fourth and third written marks indicating these blocks were written earlier than the first written mark was written. Namely, according to the example shown in FIG. 8, physical blocks PBA#6, #15, and #16 are retrieved as the physical blocks which have not been written for more than one period.

In the present embodiment, a physical block which has not been written for more than one period is regarded as a physical block storing (first physical block) the LFWD. In a case where such a physical block (first physical block) is retrieved, the memory controller 3 retrieves another physical block (second physical block) by the retrieving process for an empty block, then transfers (or copies) all data stored in the first physical block which was regarded as storing the LFWD to the second physical block. Then, the memory controller 3 writes the current written mark to the second physical block. More particularly, as an example, as shown (5A), (5B), (5C) in FIG. 8, all data stored in the retrieved physical blocks, PBA#6, #15, and #16 is respectively transferred (copied) to one of the empty physical blocks PBA#32, #33, and #34 which were retrieved by the retrieving process. Then, the redundant areas 105 of the physical blocks PBA#32, #33, and #34 respectively store LBN#6, #15, and #16 as the logical address data, and store the second written mark 5Ah as the current written mark.

Following the completion of the transfer process, the data stored in the transferring physical blocks is erased. Particularly, the memory controller 3 supplies internal commands to the flash memory 2 which instruct to erase the data stored in the physical blocks, PBA#6, #15, and #16. The flash memory 2 erases the data stored in the physical blocks PBA#6, #15, and #16 in accordance with the internal commands.

In addition, the rule by which to define a physical block storing the LFWD might be adequately defined considering the number of periods for which the written mark completed rotates (and/or the term of the single period) and so on. Namely, it is a practical issue to make the rule to define which physical blocks are regarded as one storing the LFWD.

Further, where there are a small number of the written marks for one rotation of the period, it should be noted that a newly stored written mark may be the same mark as an old written mark which was previously stored prior to the one rotation of the written mark. Therefore, a use of the same written marks in multiple physical blocks which were written in different rotations of the written mark should be avoided. Particularly, it is necessary for the memory controller 3 to complete the retrieving process and the data transfer process by the end of the rotation after which the same written mark might be used. The memory controller 3 might precede the data transfer process in which the LFWD is transferred, and might continue to reject the command supplied from the host system 4 until there is no physical block which has not been written for more than one rotation so that it is possible to more properly manage the written marks.

The current written mark is stored, for example, in the memory area of the memory controller 3, e.g. work area 8 (nonvolatile memory like SRAM etc.). The written mark stored in the work area 8 is transferred (stored), at a proper timing, to the flash memory 2. When the power is turned off, the stored written mark in the work area 8 will be erased. However, the written mark stored in the flash memory 2 is to be read to the work area 8 when the power in on. After that, the transferred written mark is used as the current written mark. Alternatively, it is also practical to provide a memory area made of a nonvolatile RAM such as FeRAM (Ferroelectric Random Access Memory), MRAM (Magnetic Random Access Memory) etc. in the memory controller 3, and to store the written mark in the memory area. In a case where the written mark is stored in the nonvolatile RAM like mentioned above, the written mark is controlled on the nonvolatile RAM, and it is not necessary to copy the written mark to the flash memory 2.

Data stored in a physical block which is regarded one storing the LFWD is erased after the data is transferred to another physical block. Then the physical block of which data was transferred becomes an empty physical block. The empty physical block might not have been often written. However, the block might be more frequently written because of its erase status. Put another way, the number of rewritings might be increased. On the other hand, the physical block to which the LFWD was transferred might have frequently been written. However, the block might be less frequently written after the transfer process because the LFWD is now stored. Due to the above mentioned theory, it is possible to expect that the number of writing a plurality of the physical blocks in the flash memory 2 becomes even.

Hereinafter, an outline of the process executed in the embodiment will be discussed referring to FIG. 9.

Initially, a default is set (S101). For example, the memory controller 3 sets a current written mark.

Following the default set, when the memory controller 3 receives a writing command from the host system 4, the memory controller 3 decides whether or not it is necessary to newly assign a physical block corresponding to a logical block to which a logical access area belongs, the logical access area being appointed by the written command (S1102). In case of YES (YES at S1102), the retrieving process for an empty block is executed, then the logical block to which the appointed logical access area by the writing command belongs is newly assigned to the retrieved empty block (S1103). Particularly, the LBN of the logical block and the current written mark are stored in the redundant area 105 of the retrieved empty block (physical block), the logical block to which the logical access area appointed by the writing command belongs. A process with respect to the newly assigning the logical block to the physical block will be executed at the step 1103. Where the result of the processes meets a predetermined condition, the written mark is updated. Where the result does not meet the predetermined condition, the written mark remains.

The memory controller 3 determines whether or not to update the written mark at the step 1103. Where the memory controller updates the written mark (YES at S1104), the retrieving process for the physical block storing the LFWD is executed. Where the physical block storing the LFWD is retrieved, the memory controller 3 executes the data transfer process in which the stored date in the retrieved physical block (first physical block) is transferred to another physical block (second physical block, S1105). Particularly, the physical block which has not been written for more than one period is retrieved, the stored data in the retrieved physical block is transferred to another physical block. Following the transfer process, the stored data in the retrieved physical block is erased.

According to the above explanation, the physical block stores a new written mark when the logical block is newly assigned to the physical block. The written mark is a version-information which is incremented when a result by the process with respect to newly assigning a logical block to a physical block meets a predetermined condition. The physical block storing an old written mark is regarded as the physical block storing the LFWD, the old written mark being a mark which was written two previous periods or earlier. Only when such physical blocks storing the LFWD are present, the wear-leveling control involving the physical blocks is executed.

As discussed above, the written mark is a version-information which is incremented when a result by the process with respect to newly assigning a logical block to a physical block meets a predetermined condition. With respect to the process newly assigning a logical block to a physical block, and to the predetermined condition, one of any examples described below from the first to the fourth examples may be adopted. Hereinafter, each example will be explained.

FIRST EXAMPLE

In the first example, the "process with respect to newly assigning a logical block to a physical block" means a process in which a count number is incremented or decremented, the count number indicating the number of writing (or updating) a physical block (the table storing block) in which the address mapping table is stored. Hereinafter the number indicating the number of writing the table storing block is named as a "updating count number." The predetermined condition means that the updating count number reaches a predetermined number.

The updating count number is incremented (or decremented) every time on which the table storing block is written (or updated). The updating count number after the increment (or decrement) is stored in the table storing block. Due to the process, it is possible to recognize how many times the table storing block has been written by using the updating count number stored in the table storing block. Additionally, as discussed above, the table storing block stores the updating count number and not the written mark. Therefore, as shown in FIG. 10A, the flash memory stores two different physical blocks: One is physical blocks (hereinafter as data storing blocks) which store a plurality of data supplied from the host system, and the other is table storing blocks which store the address mapping table, such as physical blocks PBA#5 or PBA#14. Further, as long as the written mark and the updating count number are respectively stored, it is possible to distinguish whether a physical block is the data storing block or the table storing block by checking either the written mark stored or the updating count number stored. Further, with respect to the data storing block, it might be practical to store other data instead of the logical address data, the data indicating that the block is a data storing block (or the data indicating an address mapping table corresponding to one of any logical zones).

In the first example, the condition for writing the written mark is predetermined before the process executes, for example, how many times of writing to the table storing block are required to update the written mark. Namely, a predetermined number for the updating count number is preset. When the table storing block is written, the updating count number is incremented (or decremented). Then, when the updating count number after the increment (or decrement) reaches the predetermined number, the written mark is updated. For example, in a case where the predetermined is 15 (0Fh), the written mark is updated when the table storing block stores the new updating count number 15(0Fh). Further, in the embodiment, if the next updating count number after 15(0Fh) is set 0(00h), the written mark and the updating count number will never overlap.

In addition, the condition for updating the written mark is adequately set in various ways. The condition can use one of any updating count numbers of the table storing blocks in which the address mapping tables of the logical zones are stored. Further, it is also possible to store the current written mark in the table storing block.

Hereinafter, the process with respect to the first example will be explained.

The memory controller 3, for example, executes a process shown in FIG. 10B at the S103 in FIG. 9. Namely, the memory controller 3 decides whether or not an empty physical page remains in a physical block functioning as a table storing block when the controller 3 updates the address mapping table so that a logical block is newly assigned to an physical block. Herein, the empty physical page is able to store the updated address mapping table (S1111).

In a case where there is no empty physical page (YES at S1111), the memory controller 3 executes the step S1112. Namely, the memory controller 3 executes the retrieving process to retrieve another empty physical block (second physical block). The retrieved physical block through the process is newly assigned as a table storing block (in brief, switching the table storing block). Further, the memory controller 3 reads the updating count number which was stored in the physical block which was previously assigned as a table storing block, then, increments (or decrements) the updating count number. The memory controller 3 writes the updating count number after the increment (or the decrement) and the updated address mapping table in the physical block (empty block) is newly assigned as the table storing block. Further, the memory controller 3 updates an old PBA to a new PBA of the physical block is newly assigned as the table storing block. The old PBA corresponds to an LZN of a logical zone with respect to the address mapping table in the table control information 101 (see FIG. 6).

After the process, the memory controller 3 decides whether or not the updating count number after the increment (or the decrement) reaches a predetermined number (S1113). When the updating count number meets the predetermined number (YES at S1113), the memory controller 3 updates the written mark (S1114).

Hereinbefore, the first example was described. Additionally, it is preferable to store the current written mark in the flash memory 2 or any nonvolatile RAM.

SECOND EXAMPLE

In the second example, the "process with respect to newly assigning a logical block to a physical block" means a process in which a count number is incremented or decremented, the count number indicating the number of switching physical blocks (control information blocks) in which the table control information is stored. Hereinafter the number indicating the switching number is named as a "switching count number." The "predetermined condition" means that the switching count number reaches a predetermined number.

The switching count number is incremented (or decremented) every time on which the control information block is switched. The switching count number is stored in a physical block assigned as the control information block. Due to the process, it is possible to recognize how many times the control information block has been switched using the switching count number stored in the control information block.

The control information block is selected among the control information block candidates. In the example shown in the FIG. 11A, the physical blocks PBA#0 and PBA#1 are the control information block candidates. Accordingly, one of the physical blocks PBA#0 and PBA#1 are to be used as the control information block. The control information block may store the current written mark.

In addition, in the example, neither the physical block PBA#0 nor PBA#1 is assigned as the table storing block or the data storing block. Also, it is not necessary to store the updating count number in the table storing block.

In the second example, the condition, on which how many times the control information block has to be switched, to update the written mark is predetermined. Namely, a predetermined number for the switching count number is preset. When the control information block is switched, the switching count number is incremented (or decremented). Then, when the switching count number after the increment (or decrement) reaches the predetermined number, the written mark is updated. The predetermined number might be singular or plural (for example, multiple of a natural number).

Hereinafter, the process with respect to the second example will be described.

Figures 11A, 11B:
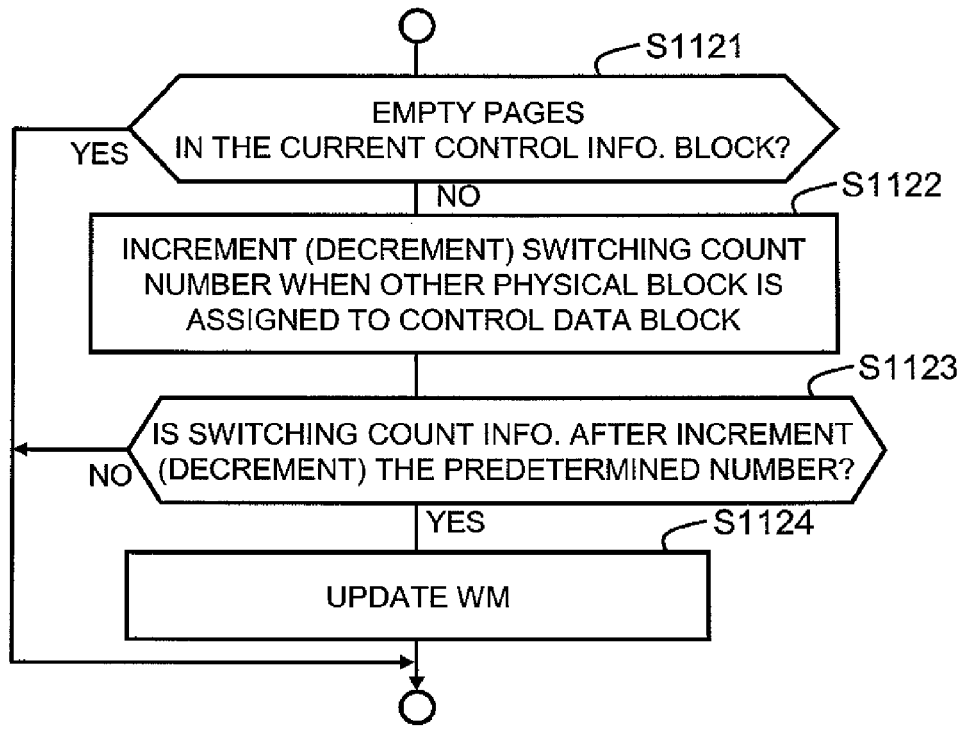
FIG. 11A shows a diagram of the flash memory having physical blocks with the written mark and physical blocks storing a switching count number in random.
FIG. 11B shows procedures of a second example in which the written mark is updated.

The memory controller 3, for example, executes processes shown in FIG. 11B at S1103 in FIG. 9. Namely, the memory controller 3 decides whether or not the empty physical page remains in the physical block functioning as the control information block in a case where table control information is updated in accordance with the process of updating the table storing block (S1121). The empty physical page is able to store the updated table control information.

In a case where there is no empty physical page (YES at S1112), the memory controller 3 executes the step S1122. Namely, the memory controller 3 selects one physical block from the above mentioned two control information block candidates as the control information block (or switching the block to the control information block). Further, the memory controller 3 reads the switching count number which was stored in the physical block which was previously used as the control information block, then, increments (or decrements) the switching count number. The memory controller 3 writes the switching count information which was incremented (or decremented) and the updated table control information in the physical block which is now the control information block after the switching.

After the process, the memory controller 3 decides whether or not the switching count number after the increment (the decrement) reaches a predetermined number (S1123). Where the switching count number reaches the predetermined number (YES at S1123), the memory controller 3 updates the written mark (S1124).

Hereinbefore, the second example was described. Additionally, it is preferable to store the current written mark in the flash memory 2 or any nonvolatile RAM.

THIRD EXAMPLE

In the third example, the "process with respect to newly assigning a logical block to a physical block" means a process in which empty physical blocks are retrieved, and a process which is executed at from the top physical block toward the bottom physical block. The "predetermined condition" means that the retrieving process completes one rotation. The one rotation of the retrieving empty block process means a status where the retrieving process returns to the top physical block after retrieving the bottom physical block. The retrieving process begins at the top physical block and move toward the bottom physical block.

Figure 12A:
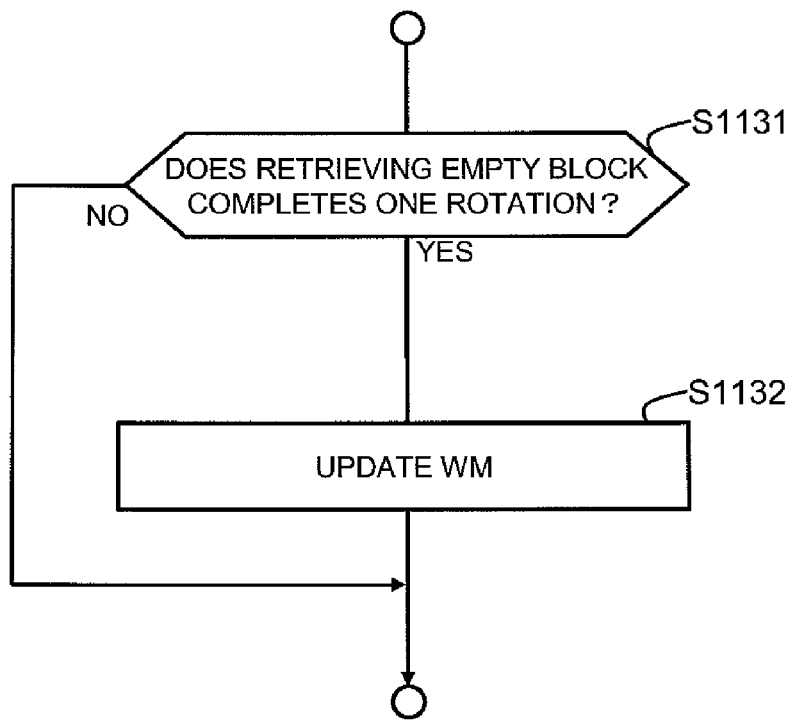
FIG. 12A shows procedures of a third example in which the written mark is updated.

The memory controller 3, for example, executes processes shown in FIG. 12A at S1103 in FIG. 9. Namely, the memory controller 3 updates the written mark (S1132) when the retrieving process of the empty block completes one rotation (YES at S1131).

Additionally, it is safer to store the current written mark in either the flash memory 2 or the nonvolatile RAM. It is also preferable to store a retrieve starting block in either the flash memory 2 or the nonvolatile RAM. The retrieve starting block means a block from which the retrieving process will start at the next time. Even though, in the third example, the predetermined condition is where the retrieving process complete one rotation. The predetermined condition might be not only one rotation but two rotations or multiple rotations also. In case of using these conditions, the count number indicating the rotating number of the empty block retrieving is updated ever time on which the empty block retrieving process completes one rotation. It is also better to store the count number of the rotation in either the flash memory 2 or the nonvolatile RAM.

FOURTH EXAMPLE

In the fourth example, the "process with respect to newly assigning a logical block to a physical block" means a process in which a count number is incremented or decremented. The count number indicates how many times logical blocks have been assigned to a physical block (hereinafter, the count number is the "assignment count number"). The "predetermined condition" means that the assignment count number reaches a predetermined number.

The assignment count number is incremented (or decremented) every time on which the logical block is newly assigned to the physical block. Accordingly, it is possible to recognize how many times logical blocks have been assigned to the physical blocks by the assignment number.

In the fourth example, the predetermined times is preset. The predetermined times means the condition on which the written mark is updated. Namely, the predetermined number (times) has been set for the assignment count number. The predetermined number might be singular or plural (for example, multiple of natural numbers).

Figure 12B:
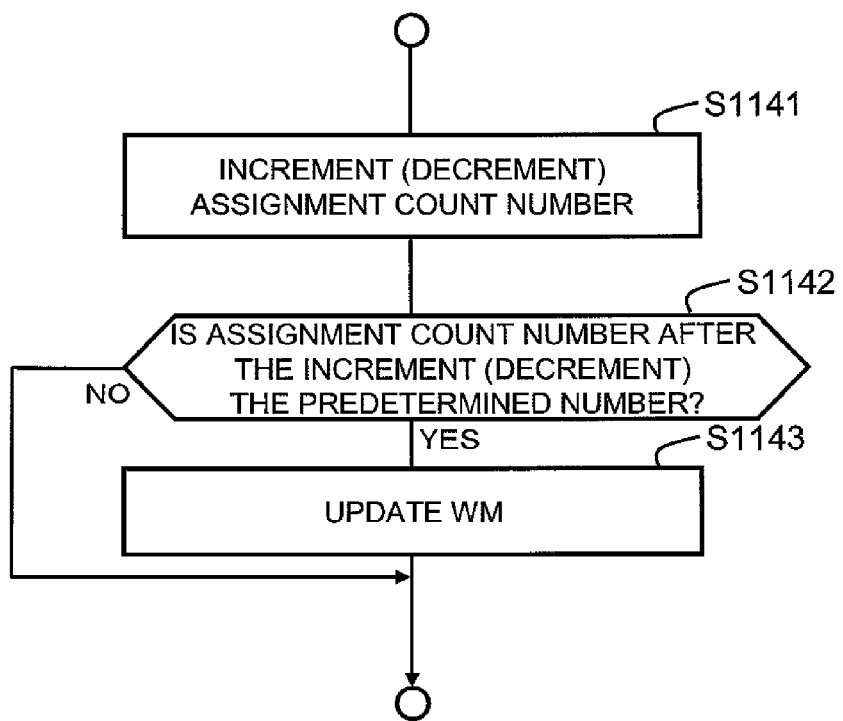
FIG. 12B shows procedures of a fourth example in which the written mark is updated.

The memory controller 3, for example, executes processes shown in FIG. 12B at S1103 in FIG. 9. Namely, for example, the memory controller 3 increments (decrements) the assignment count number when a logical block is newly assigned to a physical block in the work memory (SRAM) 8 (S1141). Then, the memory controller 3 decides whether or not the assignment count number after the increment reaches the predetermined number (S1142). Where the assignment count number meets the predetermined number (YES at S1142), the memory controller 3 updates the written mark (S1143).

Hereinbefore, the fourth example was described. Additionally, it is preferable to store the current written mark and the assignment count number either in the flash memory 2 or in any nonvolatile RAM. The assignment count number might be stored in a physical block to which the logical block was newly assigned.

The above embodiments with respect to the present invention are example to explain the invention. The present invention is not limited to these embodiments. A skilled person in the art might practice the invention in various embodiments within the scope of the invention.

For example, with respect to the first embodiment, it is not necessary to retrieve a physical block storing the LFWD only every time on which the count number becomes multiples of (N times K). It might be practical to prepare a table for setting a timing of retrieving physical blocks, and to decide the timing of retrieving the physical blocks storing the LFWD based on the table. A sample of the table is a table which stores the numbers of the physical blocks and the timings of retrieving in correspondence to the numbers (for example, every time on which the count number reaches multiple of 4096 where the number of blocks is 512).

With respect to the second embodiment, the memory controller 3 might select one of any examples from the first to the fourth, and might update the written mark in accordance with the example. Particularly, the memory controller 3 might have four modes with respect to the four examples: 1st mode in which the written mark is updated in accordance with the first example, 2nd mode in which the written mark is updated in accordance with the second example, 3rd mode in which the written mark is updated in accordance with the third example, and 4th mode in which the written mark is updated in accordance with the fourth example. The memory controller 3 might select one of the four modes according to the commands from the host system 4 or any events occurred during the processes, and might update the written mark according to the selected mode.

What is claimed is:

1. A memory controller for controlling access to a flash memory having physical blocks, in which stored data is erased, based on access instructions supplied from a host system, the memory controller comprising:
    a block controller which controls a correspondence relation between the physical blocks and logical blocks, which are composed of plural sectors in a logical address space in the host system, and which assigns the logical blocks to the physical blocks;
    a data writing module which writes data supplied from the host system into the physical blocks corresponding to the logical blocks based on the access instructions;
    a global counter which serves as a common counter of the plural physicals blocks, and which updates a global count number every time any logical block is newly assigned to a physical block;
    a count information writing module which writes count information based on the global count number into any physical block to which any logical block is newly assigned;
    a determining module which determines whether or not to transfer stored data in a specific physical block to another physical block in accordance with the global count number and specific count information stored in the specific physical block; and
    a data transfer module which transfers the stored data in the specific physical block storing the specific count information to another physical block based on a determination by the determining module to transfer the stored data.

2. The memory controller according to claim 1, wherein the count information is numeric data derived from a predetermined digit of the global count number where the global count number is represented by binary notation.

3. The memory controller according to claim 1, wherein a difference between the value which the specific count information represents and the value which the count information based on the global count number represents is more than a predetermined value.

4. The memory controller according to claim 3, wherein the predetermined value is defined by a number of the physical blocks of which the flash memory is composed.

5. A flash memory system comprising:
    the memory controller according to claim 1, and
    a flash memory configured to be accessed by the memory controller.

6. A method in a memory controller for controlling access to a flash memory having physical blocks, in which stored data is erased, based on access instructions supplied from a host system, the method comprising:
    a block control step of controlling a correspondence relation between the physical blocks and logical blocks, which are composed of plural sectors in a logical address space in the host system, and of assigning the logical blocks to physical blocks;
    a data writing step of writing data supplied from the host system into the physical blocks corresponding to the logical blocks based on the access instructions;
    a count step of updating a global count number, by a global counter in the memory controller, which serves as a common counter of the plural physicals blocks, every time any logical block is newly assigned to a physical block;
    a count information writing step of writing count information, based on the global count number, into any physical block, into which any logical block is newly assigned;
    a determining step of determining whether or not to transfer stored data in a specific physical block to another physical block in accordance with the global count number and specific count information stored in the specific physical block; and
    a data transfer step of transferring the stored data in the specific physical block storing the specific count information to another physical block in a case where the determining step determines to transfer the stored data.

7. The flash memory control method according to claim 6, wherein
    the count information is numeric data derived from a predetermined digit of the global count number where the global count number is represented in binary notation.

8. The flash memory control method according to claim 6, wherein
    the difference between the value which the specific count information means and the value which count information based on the count number represents is more than a predetermined value.

9. The flash memory control method according to claim 6, wherein
    the predetermined value is defined by the number of the physical blocks of which the flash memory is composed.

10. A memory controller for controlling access to a flash memory having physical blocks, in which stored data is erased, based on access instructions supplied from a host system, the memory controller comprising:

a logical block assignment module which assigns logical blocks to the physical blocks, the logical blocks being composed of areas with plural sectors in a logical address space in the host system;

an address mapping table control module which controls an address mapping table indicating a correspondence relation between the physical blocks and the logical blocks which are assigned by the logical block assignment module;

an address mapping table storing module which stores the address mapping table in a physical block which is assigned as a table storing block for storing the address mapping table, when the address mapping table control module updates at least a part of the correspondence relation with the logical blocks and the first physical blocks;

a table storing block control module which newly assigns another physical block as the table storing block when there is no empty area to store the address mapping table in the physical block which was previously assigned as the table storing block;

a count information writing module in a global counter that is a common counter of the physicals blocks, which updates a stored global count number, when the physical block with an empty area is assigned as the table storing block, and which writes a latest count number which is an updated count number to the physical block which is newly assigned as the table storing block, when the table storing block control module newly assigns the table storing block;

a version-information decision module which decides version-information based on the latest count number, the version-information being stored in the another physical block to which the logical block is newly assigned;

a version-information writing module which writes the version-information decided by the version-information decision module to the another physical block to which the logical block is newly assigned;

a determining module which determines whether or not to transfer stored data in a specific physical block to another physical block in accordance with specific version-information stored in the specific physical block; and a data transfer module which transfers the stored data in the specific physical block storing the specific version-information to another physical block when the determining module decides to transfer the stored data.

11. The memory controller according to claim 10, wherein the version-information includes at least three predetermined types of version-information which rotate in a predetermined order, and the determining module determines to transfer stored data when a difference between the specific version-information and current version-information is more than a predetermined value.

12. A flash memory system comprising:
the memory controller according to claim 10, and
a flash memory which the memory controller accesses.

13. A memory controller for controlling access to a flash memory having physical blocks, in which stored data is erased, based on access instructions supplied from a host system, the memory controller comprising:

a logical block assignment module which assigns logical blocks to the physical blocks, the logical blocks being composed of areas with plural sectors in a logical address space in the host system;

an address mapping table control module which controls an address mapping table indicating a correspondence relation between the physical blocks and the logical blocks which are assigned by the logical block assignment module;

an address mapping table storing module which stores the address mapping table in a physical block which is assigned as a table storing block for the address mapping table, when the address mapping table control module updates at least a part of the correspondence relation with the logical blocks and the physical blocks;

a table storing block control module which newly assigns another physical block as the table storing block when there is no empty area to store the address mapping table in the physical block which was previously assigned as the table storing block;

a control information storing module which stores control information in a physical block which is assigned as a control information block, the control information indicating the physical block assigned as the table storing block, the control information block which is the physical block to which the control information is stored, when the table storing block control module newly assigns the table storing block;

a control information block controlling module which newly assigns another physical block as the control information block when there is no empty area to store the control information in the physical block which was assigned as the control information block;

a count information writing module in a global counter that is a common counter of the physical blocks, which updates a global count number when the physical block with an empty area is assigned as the table storing block, and writes a latest count number which is an updated count number in the physical block which is newly assigned as the control information block, when the control information control module newly assigns the control information block;

a version-information decision module which decides a version-information based on the latest count number, the version-information being stored in the physical block to which the logical block is newly assigned;

a version-information writing module which writes the version-information decided by the version-information decision module to the another physical block to which the logical block is newly assigned;

a determining module which determines whether or not to transfer stored data in a specific physical block to another physical block in accordance with specific version-information stored in the specific physical block; and a data transfer module which transfers the stored data in the specific physical block storing the specific version-information to another physical block when the determining module decides to transfer the stored data.

14. The memory controller according to claim 13, wherein the version-information includes at least three predetermined types of version-information which rotate in a predetermined order, and the determining module determines to transfer stored data when a difference between the specific version-information and current version-information is more than a predetermined value.

15. A flash memory system comprising:
the memory controller according to claim 13, and
a flash memory which the memory controller accesses.

16. A memory controller for controlling access to a flash memory having physical blocks, in which stored data is erased, based on access instructions supplied from a host system, the memory controller comprising:

a block control module which controls a correspondence relation between the physical blocks and logical blocks, which are composed of areas with plural sectors in a logical address space in the host system;

a count module in a global counter in the memory controller, which is a common counter of the plural physicals blocks, which updates a global count number every time any logical block is newly assigned to any physical block;

a version-information control module which updates version-information that is to be written to any physical block to which a logical block is assigned when the global count number reaches a predetermined value;

a version-information writing module which writes the version-information to a physical block when a logical block is newly assigned;

a determining module which determines whether or not to transfer stored data in a specific physical block to another physical block in accordance with specific version-information stored in the specific physical block; and a data transfer module which transfers the stored data in the specific physical block storing the specific version-information to another physical block where the determining module determines positively to transfer the stored data.

17. The memory controller according to claim 16, wherein the version-information includes at least three predetermined types of version-information which rotate in a predetermined order, and the determining module determines to transfer stored data when a difference between the specific version-information and current version-information is more than a predetermined value.

18. A flash memory system comprising:

the memory controller according to claim 16, and a flash memory which the memory controller accesses.

19. A method for controlling access to a flash memory having physical blocks, in which stored data is erased, based on access instructions supplied from a host system, the control method comprising:

a logical block assignment step of assigning logical blocks to the physical blocks, the logical blocks being composed of areas with plural sectors in a logical address space in the host system;

an address mapping table control step of controlling an address mapping table indicating a correspondence relation between the physical blocks and the logical blocks which are assigned at the logical block assignment step;

an address mapping table storing step of storing the address mapping table in a physical block which is assigned as a table storing block for storing, when updating at least a part of the correspondence relation with the logical blocks and the first physical blocks at the address mapping table control step;

a table storing block control step of newly assigning another physical block as the table storing block where there is no empty area to store the address mapping table in the physical block which was assigned as the table storing block;

a count data writing step of updating a stored global count number by a global counter, which serves as a common counter of the physical blocks, when the physical block with an empty area is assigned as the table storing block, and which writes a latest count number which is an updated count number to a physical block which is newly assigned as the table storing block, when the table storing block is newly assigned at the table storing block control step;

a version-information decision step of deciding version-information based on the latest count number, the version-information being stored in the another physical block to which the logical block is newly assigned;

a version-information writing step of writing the version-information decided in the version-information decision step to the another physical block to which the logical block is newly assigned;

a determining step of determining whether or not to transfer stored data in a specific physical block to another physical block in accordance with specific version-information stored in the specific physical block; and a data transfer step of transferring the stored data in the specific physical block storing the specific version-information to another physical block when determining to transfer the stored data at the data transfer step.

20. A method for controlling access to the flash memory according to claim 19, wherein the version-information includes at least three predetermined types of version-information which rotate in a predetermined order, and it is determined in the determining step to transfer stored data when a difference between the specific version-information and current version-information is more than a predetermined value.

21. A method for controlling access to a flash memory having physical blocks, in which stored data is erased, based on access instructions supplied from a host system, the control method comprising:

a logical block assignment step of assigning logical blocks to the physical blocks, the logical blocks being composed of areas with plural sectors in a logical address space in the host system;

an address mapping table control step of controlling an address mapping table indicating a correspondence relation between the physical blocks and the logical blocks which are assigned at the logical block assignment step;

an address mapping table storing step of storing the address mapping table in a physical block which is assigned as a table storing block for the address mapping table, when updating at least a part of the correspondence relation with the logical blocks and the physical blocks at the address mapping table control step:

a table storing block control step of newly assigning another physical block as the table storing block when there is no empty area to store the address mapping table in the physical block which was previously assigned as the table storing block;

a control information storing step of storing a control information in a physical block which is assigned as a control information block, the control information indicating the physical block assigned as the table storing block, the control information block which is the physical block to which the control information is stored, when newly assigning the table storing block at the table storing block control step;

a control information block controlling step of newly assigning another physical block as the new control information block when there is no empty area to store the control information in the physical block which was assigned as the control information block;

a count information writing step of updating a stored global count number by a global counter, which serves as a common counter of the physical blocks, when the physical block with an empty area is assigned as the table storing block, and writing a latest count number which is an updated count number in the physical block which is newly assigned as the control information block, when the control information block is newly assigned at the control data control step;

a version-information decision step of deciding version-information based on the latest count number, the version-information being stored in the physical block to which the logical block is newly assigned;

a version-information writing step of writing the version-information decided in the version-information decision step to the another physical block to which the logical block is newly assigned;

a determining step of determining whether or not to transfer stored data in a specific physical block to another physical block in accordance with specific version-information stored in the specific physical block; and a data transfer step of transferring the stored data in the specific physical block storing the specific version-information to another physical block when deciding to transfer the stored data at the determining step.

22. A method for controlling access to the flash memory according to claim 21, wherein the version-information includes at least three predetermined types of version-information which rotate in a predetermined order, and it is determined in the determining step to transfer stored data when a difference between the specific version-information and current version-information is more than a predetermined value.

23. A method for controlling access to a flash memory having physical blocks, in which stored data is erased, based on access instructions supplied from a host system, the control method comprising:

a block control step of controlling a correspondence relation between the physical blocks and logical blocks, which are composed of areas with plural sectors in a logical address space in the host system;

a count step of updating a global count number, by a global counter which serves as a common counter of the physical blocks, every time any logical block is newly assigned to any physical block;

a version-information control step of updating version-information that is to be written to any physical block to which a logical block is assigned when the global count number reaches a predetermined value;

a version-information writing step of writing the version-information to the physical block when a logical block is newly assigned;

a determining step of determining whether or not to transfer stored data in a specific physical block to another physical block in accordance with specific version-information stored in the specific physical block; and a data transfer step of transferring the stored data in the specific physical block storing the specific version-information to another physical block when it is positively determined to transfer the stored data at the determining step.

24. A method for controlling access to the flash memory according to claim 23, wherein the version-information includes at least three predetermined types of version-information which rotate in a predetermined order, and it is determined in the determining step to transfer stored data when a difference between the specific version-information and current version-information is more than a predetermined value.

\* \* \* \* \*